United States Patent
Sadanaka et al.

(12) 
(10) Patent No.: US 6,801,957 B1
(45) Date of Patent: Oct. 5, 2004

(54) INFORMATION-OUTPUTTING APPARATUS AND CONNECTION-RELATION MANAGEMENT METHOD

(75) Inventors: Kazue Sadanaka, Tokyo (JP); Yuji Kimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 335 days.

(21) Appl. No.: 09/668,601

(22) Filed: Sep. 22, 2000

(30) Foreign Application Priority Data

Sep. 28, 1999 (JP) .......................................... P11-273609

(51) Int. Cl.[7] .................................................. G06F 3/00
(52) U.S. Cl. ............................. 710/16; 710/8; 345/716; 345/735
(58) Field of Search ............................... 710/16, 21, 8; 386/97, 124; 345/716, 735

(56) References Cited

U.S. PATENT DOCUMENTS

| | | | |
|---|---|---|---|
| 6,208,388 B1 * | 3/2001 | Farleigh | 348/705 |
| 6,292,846 B1 * | 9/2001 | Hara et al. | 710/5 |
| 6,434,447 B1 * | 8/2002 | Shteyn | 700/245 |
| 6,453,364 B1 * | 9/2002 | Hara | 710/16 |
| 6,466,971 B1 * | 10/2002 | Humpleman et al. | 709/220 |
| 6,496,504 B1 * | 12/2002 | Malik | 370/390 |
| 6,504,996 B1 * | 1/2003 | Na et al. | 386/125 |
| 6,529,680 B1 * | 3/2003 | Broberg | 386/83 |

* cited by examiner

*Primary Examiner*—Jeffrey Gaffin
*Assistant Examiner*—Eron Sorrell
(74) *Attorney, Agent, or Firm*—Oblon, Spivak, McClelland, Maier & Neustadt, P.C.

(57) ABSTRACT

An IEEE 1394 I/F circuit detects, through a digital I/O terminal, pieces of information each peculiar to one of electronic apparatuses connected to an information-outputting apparatus by using a digital bus and supplies the information to a control unit. The control unit reports the pieces of peculiar information to the user by displaying the information on a screen of a display unit employed in the information-outputting apparatus. By referring to the pieces of peculiar information displayed, the user operates a remote commander to select one of the electronic apparatuses that is most likely connected to an analog input terminal of the information-outputting apparatus for each of the pieces of information. The piece of information peculiar to the selected electronic apparatus is associated with the analog input terminal most likely connected to the selected electronic apparatus. The associations are then stored in a connection management memory as an analog-connection state under control. As a result, it is possible to provide an information-outputting apparatus capable of flexibly keeping up with dynamic switching from an analog signal to a digital signal supplied thereto and vice versa in an environment of coexisting analog and digital connections, and to provide a connection-relation management method adopted in the information-outputting apparatus.

34 Claims, 10 Drawing Sheets

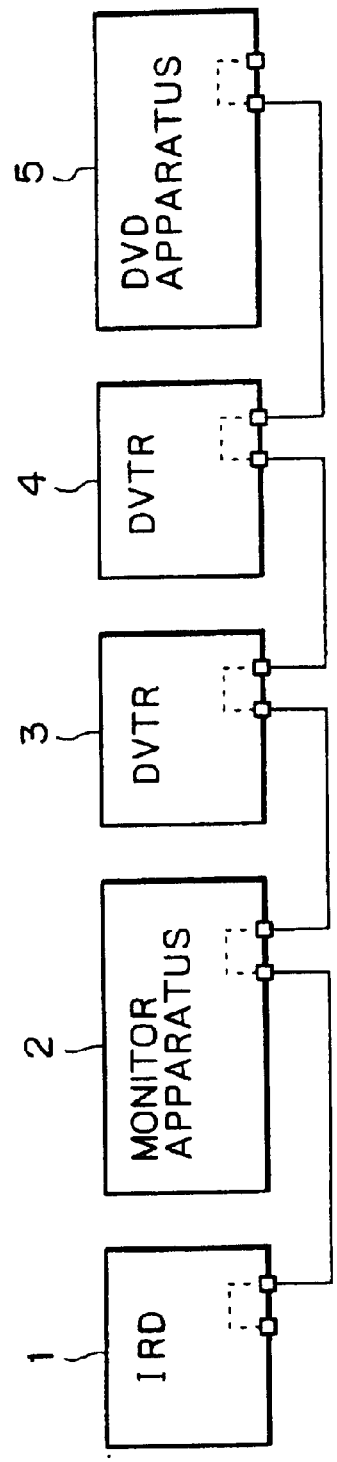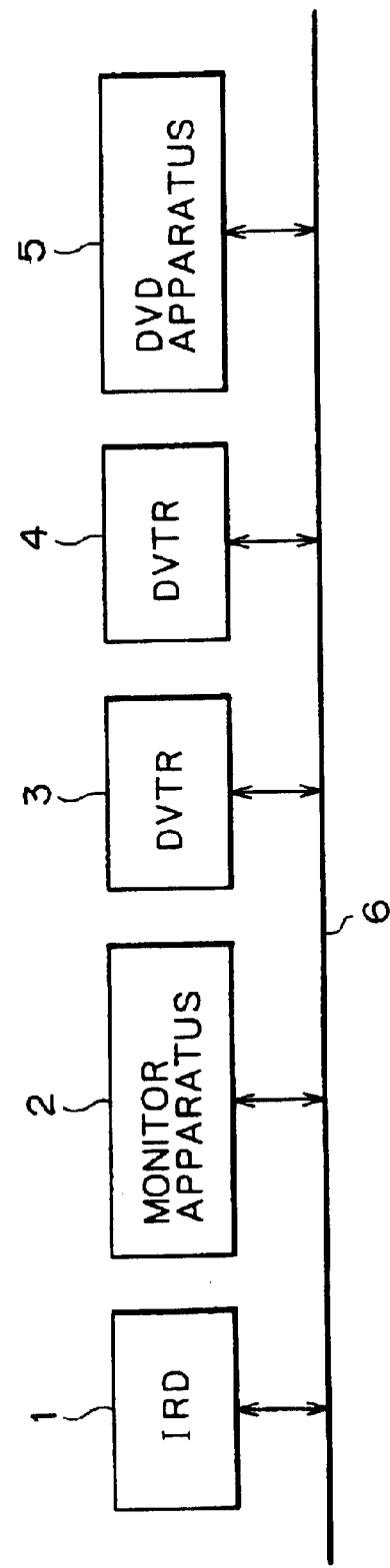

INFORMATION-OUTPUTTING APPARATUS AND CONNECTION-RELATION MANAGEMENT METHOD

BACKGROUND OF THE INVENTION

The present invention relates to an information-outputting apparatus provided with a digital interface conforming to typically an IEEE 1394 standard and a plurality of analog input terminals or a plurality of analog interfaces and used for managing connection relations of a plurality of electronic apparatuses connected to the information-outputting apparatus, and relates to a connection-relation management method adopted in the information-outputting apparatus.

In recent years, a variety of digital contents are abundantly provided by way of communication media such as broadcasting media and the Internet as well as through recording media like a DVD (digital video disc). It is conceivably possible to widen the range of applications of such abundantly available digital contents and to well provide an environment of utilizing the digital contents wherein the user has a high degree of freedom to use the contents.

It is also conceivably possible to provide an analog interface as well as a digital interface on a monitor apparatus referred to as an AV (Audio-Visual) apparatus and a variety of electronic apparatuses such as a playback apparatus, a recording apparatus, a recording and playback apparatus and a receiving apparatus. By providing a variety of electronic apparatuses with a digital interface as described above, a digital content can be copied and played back without deteriorating its quality.

While there are a variety of digital interfaces, a digital interface conforming to the IEEE 1394 standard draws much attention. The IEEE is an acronym of the Institute of Electrical and Electronics Engineers of the US. The digital interface conforming to the IEEE 1394 standard is capable of transmitting signals such as digital video and audio signals, which must satisfy real-time requirements, at a high speed.

The digital interface conforming to the IEEE 1394 standard transmits information in the form of a series of packets. In addition, the digital interface conforming to the IEEE 1394 standard offers a high degree of freedom to connect electronic apparatuses to form a variety of connections such as a tree connection, a star connection and a daisy-chain connection.

For example, assuming a daisy-chain connection connecting a plurality of electronic apparatuses 1, 2, 3, 4 and 5 each provided with a digital interface conforming to the IEEE 1394 standard as shown in FIG. 1A, the daisy-chain connection can be designed so that any one of the electronic apparatuses 1, 2, 3, 4 and 5 is capable of transmitting an information signal such as a video signal to a destination apparatus by including information indicating the destination apparatus in a packet containing the information signal. In addition, any one of the electronic apparatuses 1, 2, 3, 4 and 5 is capable of receiving a packet destined for the electronic apparatus itself but incapable of receiving a packet destined for an electronic apparatus other than the apparatus itself.

The daisy-chain connection connecting a plurality of electronic apparatuses 1, 2, 3, 4 and 5 each provided with a digital interface conforming to the IEEE 1394 standard as shown in FIG. 1A is equivalent to a connection wherein the electronic apparatuses 1, 2, 3, 4 and 5 are connected to each other by a single common digital bus 6 as shown in FIG. 1B.

In the conventional analog connection, each electronic apparatus must have as many analog input terminals as electronic apparatuses in the connection. In the case of the electronic apparatuses 1, 2, 3, 4 and 5 shown in FIGS. 1A and 1B, for example, the monitor apparatus 2 requires 4 analog input terminals for connecting the monitor apparatus 2 to the other 4 electronic apparatuses 1, 3, 4 and 5.

In the case of a digital interface, on the other hand, it is not necessary to provide as many digital I/O terminals as connected electronic apparatuses like the analog interface described above. A plurality of electronic apparatuses are connected by using the so-called common bus allowing digital signals to be exchanged between the electronic apparatuses.

By the way, the conventional connection among electronic apparatuses, which uses both the digital and analog interfaces, was not applied to consumer AV apparatuses. In the future, however, newly started digital television broadcasting may for example coexist with the existing analog television broadcasting so that a period in which contents are presented by using analog signals along with contents presented by using digital signals conceivably continues.

For this reason, a variety of electronic apparatuses are each provided with both analog and digital interfaces. For example, the monitor apparatus 2 conceivably has 3 analog input terminals 2a1, 2a2 and 2a3 in addition to 2 digital I/O terminals 2d1 and 2d2 as shown in FIG. 2.

The monitor apparatus 2 with such terminals is connected to a digital broadcast receiver 1 known as an IRD (Intelligent Receiver Device) and a DVTR (Digital Video Tape Recorder) 3 by analog and digital signal cables each represented by a dashed line and a solid line as shown in FIG. 2. The connection of the IRD 1 and the DVTR 3 to each other in the monitor apparatus 2 is not transparent.

For example, an electronic apparatus connected to others through a digital interface conforming to the IEEE 1394 standard communicates with the other apparatuses and knows what other apparatuses are connected to itself.

However, the monitor apparatus 2 connected to the IRD 1 and the DVTR 3 by analog signal cables through two of the analog input terminals 2a1, 2a2 and 2a3 does not know which input terminal is connected to the IRD1 and which terminal is connected to the DVTR 3. While the person in charge of installation knows how the monitor apparatus 2 is connected to the IRD 1 and the DVTR 3, the monitor apparatus 2 itself is not capable of recognizing the connections of the IRD 1 and the DVTR 3.

For this reason, when the DVTR 3 supplies analog and digital signals alternately to the monitor apparatus 2, even though the monitor apparatus 2 is capable of normally processing the digital signal received from the DVTR 3, the monitor apparatus 2 does not process the analog signal received from the DVTR 3 unless the user deliberately selects the analog input terminal 2a2 to which the DVTR 3 is connected. This is because, since there are a plurality of analog input terminals, the monitor apparatus 2 is not capable of determining which analog input terminal is receiving the analog signal.

In addition, in an actual terminal-switching operation from reception of a digital signal to reception of an analog signal in which the user deliberately selects an analog input terminal to receive the analog signal, the user normally does not know which analog input signal is used for receiving the analog signal so that the terminal-switching operation cannot conceivably be carried out quickly.

SUMMARY OF THE INVENTION

It is thus an object of the present invention to provide an information-outputting apparatus capable of flexibly keeping up with switching from an analog signal to a digital signal supplied thereto and vice versa in an environment of coexisting analog and digital connections, and to provide a connection-relation management method adopted in the information-outputting apparatus.

An information-outputting apparatus provided by the present invention comprises: a digital I/O terminal connecting the information-outputting apparatus to a plurality of electronic apparatuses through a digital bus and allowing pieces of information each peculiar to one of the electronic apparatuses to be detected by a communication; electronic-apparatus-information-detecting means for detecting the pieces of information each peculiar to one of the electronic apparatuses connected to the digital I/O terminal; information-reporting means for reporting the pieces of information each peculiar to one of the electronic apparatuses detected by the electronic-apparatus-information-detecting means to the user; a plurality of analog input terminals for connecting the information-outputting apparatus to the electronic apparatuses; apparatus-selecting and setting means used for selecting and setting one of the electronic apparatuses connected to one of the analog input terminals for each of the pieces of information peculiar to the electronic apparatuses as reported by the information-reporting means; and information management means for managing an association of each of the pieces of information peculiar to the electronic apparatuses with one of the analog input terminals connected to the electronic apparatus selected by the apparatus-selecting and setting means for the piece of peculiar information.

In the information-outputting apparatus provided by the present invention as described above, the electronic-apparatus-information-detecting means detects a piece of information peculiar to one of the electronic apparatuses connected to the digital I/O terminal; and the information-reporting means reports the piece of information peculiar to one of the electronic apparatuses detected by the electronic-apparatus-information-detecting means to the user.

The user utilizes the apparatus-selecting and setting means for selecting one of the electronic apparatuses connected to one of the analog input terminals associated with the piece of information peculiar to one of the electronic apparatuses as reported by the information-reporting means.

That is to say, if an electronic apparatus connected to the information-outputting apparatus by a digital signal cable is also connected to one of a plurality of analog input terminals employed in the information-outputting apparatus by an analog signal cable, connections to the analog input signals are managed by the information management means. It is thus possible to manage associations of the analog input terminals with electronic apparatuses each connected to one of the analog input terminals.

With the scheme described above, even if an electronic apparatus, which has been so far generating a digital signal outputs an analog signal to the information-outputting apparatus, the management information managed by the information management means is used as a basis for selecting one of the analog input terminals associated with the piece of information peculiar to the electronic apparatus quickly and correctly.

The information-outputting apparatus provided by the present invention as described above also has: input-switching means for switching an input terminal for receiving a signal among the digital I/O terminal and the analog input terminals so as to select one of the digital I/O terminal and the analog input terminals; digital-signal-existence/non-existence-detecting means for detecting existence or non-existence of a digital signal destined for the information-outputting apparatus by way of the digital I/O terminal; and switching control means for controlling the input-switching means in accordance with a detection signal output by the digital-signal-existence/non-existence-detecting means and information managed by the information management means.

When a digital signal is supplied to the information-outputting apparatus by way of the digital I/O terminal, as described above, the information-outputting apparatus is capable of determining which electronic apparatus is supplying the digital signal to itself from peculiar information detected by the electronic-apparatus-information-detecting means.

As the digital-signal-existence/non-existence-detecting means detects no longer existence of a digital signal destined for the information-outputting apparatus by way of the digital I/O terminal, information managed by the information management means is used by the switching control means as a basis for actuating the input-switching means to select a proper analog input terminal for receiving an analog signal output by one of the electronic apparatuses, which generated the digital signal so far.

It is thus possible to construct an information-outputting apparatus as well as a system comprising the information-outputting apparatus and a plurality of electronic apparatuses wherein, when any one of the electronic apparatuses supplies analog and digital signals alternately to the information-outputting apparatus, for example, the information-outputting apparatus is capable of normally receiving and processing the analog and digital signals automatically with a high degree of flexibility.

The information-outputting apparatus provided by the present invention further has: management-start-determining means for forming a judgment as to whether or not management by the information management means has been started; and control means for executing control so as to detect pieces of information each peculiar to one of the electronic apparatuses and to start managing associations of the pieces of peculiar information with the respective analog input terminals in case an outcome of the judgment formed by the management-start-determining means indicates that the management by the information management means has not been started.

In the information-outputting apparatus described above, the management-start-determining means forms a judgment as to whether or not management by the information management means has been started. If the outcome of the judgment formed by the management-start-determining means indicates that the management by the information management means has not been started, elements such as the information-detecting means, the information-reporting means and the apparatus-selecting and setting means are controlled so as to make selections and setting in order to detect pieces of information each peculiar to one of the electronic apparatuses, report the detected pieces of information to the user and start managing associations of the reported pieces of peculiar information with the respective analog input terminals.

If the management does not include associations of a plurality of analog input terminals with electronic apparatuses connected to the analog input terminals, a procedure is automatically started to manage the associations of a plurality of analog input terminals with electronic apparatuses connected thereto so that the associations of the analog input terminals with the electronic apparatuses connected by using a digital bus can be managed with a high degree of reliability.

The information-outputting apparatus provided by the present invention further has: command-receiving means for receiving a command entered by the user to start management of information; and control means for executing control so as to detect pieces of information each peculiar to one of the electronic apparatuses and to start managing associations of the pieces of peculiar information with the respective analog input terminals in response to a command entered by the user to start the management of information through the command-receiving means.

Assuming that an electronic apparatus connected to the information-outputting apparatus is disconnected or an electronic apparatus is newly connected to the information-outputting apparatus, the user enters a command via the command-receiving means to start management processing of associations of the analog input terminals with electronic apparatuses each connected to one of the analog input terminals of the information-outputting apparatus described above. In response to the command, elements such as the information-detecting means, the information-reporting means and the apparatus-selecting and setting means are controlled so as to make selections and setting in order to detect pieces of information each peculiar to one of the electronic apparatuses, report the detected pieces of information to the user and start managing associations of the reported pieces of peculiar information with the respective analog input terminals.

As described above, it is possible to start managing associations of pieces of peculiar information with their respective analog input terminals at any time in accordance with a command entered by the user. Thus, it is possible to manage status of analog connections with a high degree of accuracy in the information-outputting apparatus at any time in accordance with a command entered by the user.

In addition, the information-outputting apparatus provided by the present invention further has: connection-change-detecting means for detecting a change in connection relation; and control means for executing control so as to detect pieces of information each peculiar to one of the electronic apparatuses and to start managing associations of the pieces of peculiar information with the respective analog input terminals in the case of a change in connection relation detected by the connection-change-detecting means.

In the information-outputting apparatus described above, when the connection-change-detecting means detects disconnection of an electronic apparatus connected to the information-outputting apparatus by a digital signal cable, for example, the disconnection is determined to be a change in connection relation, and elements such as the information-detecting means, the information-reporting means and the apparatus-selecting and setting means are controlled so as to make selections and setting in order to detect pieces of information each peculiar to one of the electronic apparatuses, report the detected pieces of information to the user and start managing associations of the reported pieces of peculiar information with the respective analog input terminals.

When the connection relation is changed, a procedure for managing associations of pieces of peculiar information with the respective analog input terminals is automatically executed to allow associations of electronic apparatuses connected by a digital signal cable to the information-outputting apparatus with their respective analog input terminals to be managed all the time.

Moreover, the information-outputting apparatus provided by the present invention further has: change-information-receiving means for receiving information used for changing the associations of the analog input terminals with their respective pieces of information each peculiar to one of the electronic apparatuses; and association-changing means for changing the associations, managed by the information management means, of the analog input terminals with their respective pieces of information each peculiar to one of the electronic apparatuses in accordance with the information received through the change-information-receiving means.

In the information-outputting apparatus described above, the association-changing means is capable of changing the information-management-means-controlled associations of the analog input terminals with their respective pieces of information each peculiar to one of the electronic apparatuses in accordance with the information received through the change-information-receiving means.

Thus, when the user of the information-outputting apparatus changes the analog connections of electronic apparatuses each connected to one of the analog input terminals, for example, information managed by the information management means can be updated in accordance with the change in analog connection. As a result, it is possible to properly manage associations of pieces of peculiar information with the analog input terminals. In addition, similar management can be applied to apparatuses connected to the information-outputting apparatus by analog signal cables.

As described above, in accordance with the present invention, status of analog connections can be managed with a high degree of accuracy for electronic apparatuses each connected to the information-outputting apparatus by digital and analog signal cables. By being informed of managed information, the user is capable of knowing the status of the analog connections quickly and accurately.

In addition, by referring to obtained information on electronic apparatuses connected by a digital signal cable, an electronic apparatus serving as an information-outputting apparatus for outputting digital and analog signals supplied thereto is capable of setting status of analog connections with ease and a high degree of accuracy.

Moreover, since the status of analog connections is managed, even when any one of the electronic apparatuses supplies analog and digital signals alternately to the information-outputting apparatus, for example, the information-outputting apparatus is capable of automatically switching the input thereof from an analog signal to a digital one and vice versa without a need for the user to carry out a manual operation.

BRIEF DESCRIPTION OF THE DRAWINGS

FIGS. 1A and 1B are explanatory diagrams showing typical cases of connecting electronic apparatuses to each other by using digital interfaces conforming to an IEEE 1394 standard;

DETAILED DESCRIPTIONS OF THE PREFERRED EMBODIMENTS

The following description explains embodiments implementing an information-outputting apparatus and a connection-relation management method provided by the present invention by referring to the accompanying diagrams. The embodiments explained below are used to exemplify a case in which the information-outputting apparatus and the connection-relation management method provided by the present invention are applied to a digital monitor apparatus having typically a digital I/O terminal and a plurality of analog input terminals. In the following description, the digital monitor apparatus is referred to hereafter simply as a monitor apparatus.

It should be noted that, the embodiments described below are used to exemplify cases in which a digital interface conforming to the IEEE 1394 standard is used as a digital interface for digital connections. In addition, in order to make the description simple, the description of the embodiments does not include an explanation of the audio system of the monitor apparatus.

Figure 2:
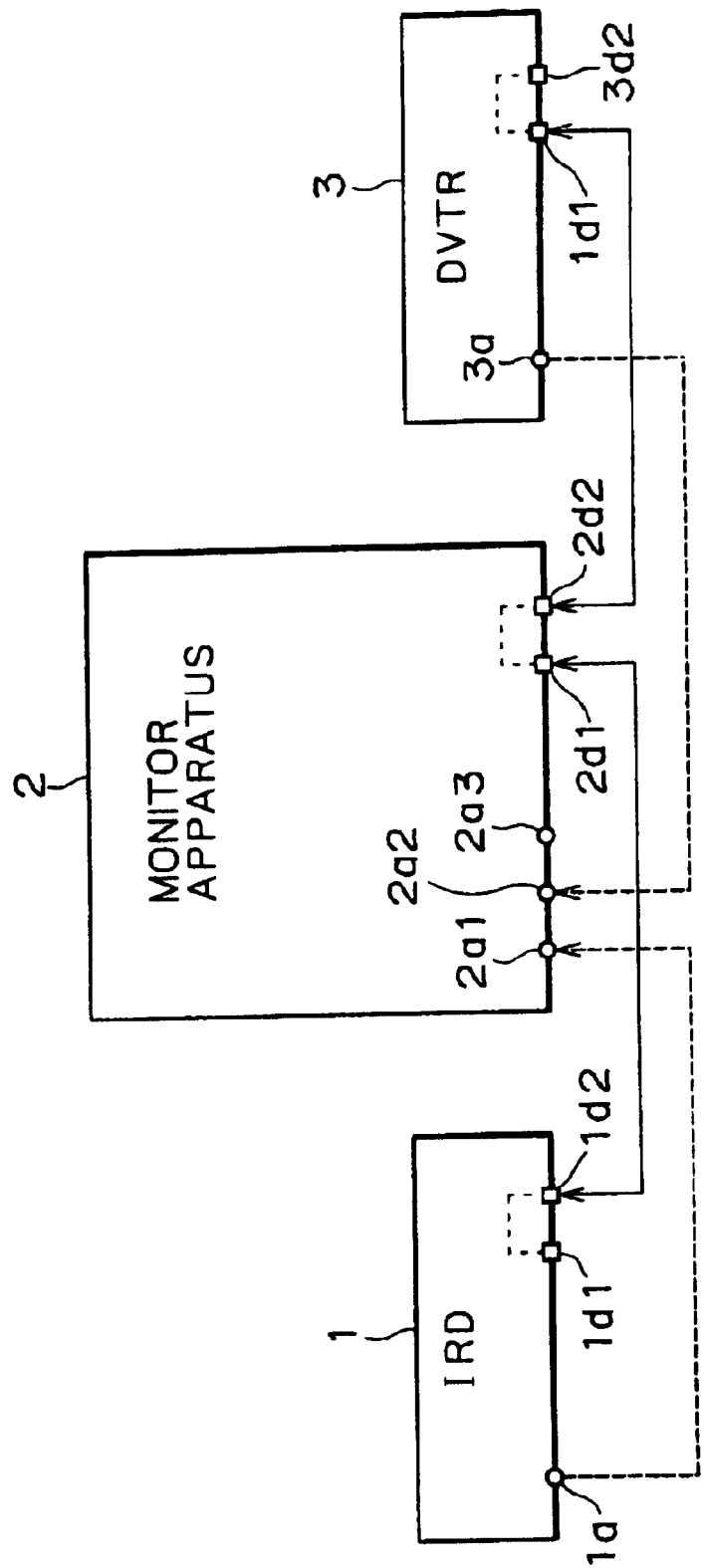
FIG. 2 is an explanatory diagram showing a typical system including coexistent digital and analog connections.
Figure 3:
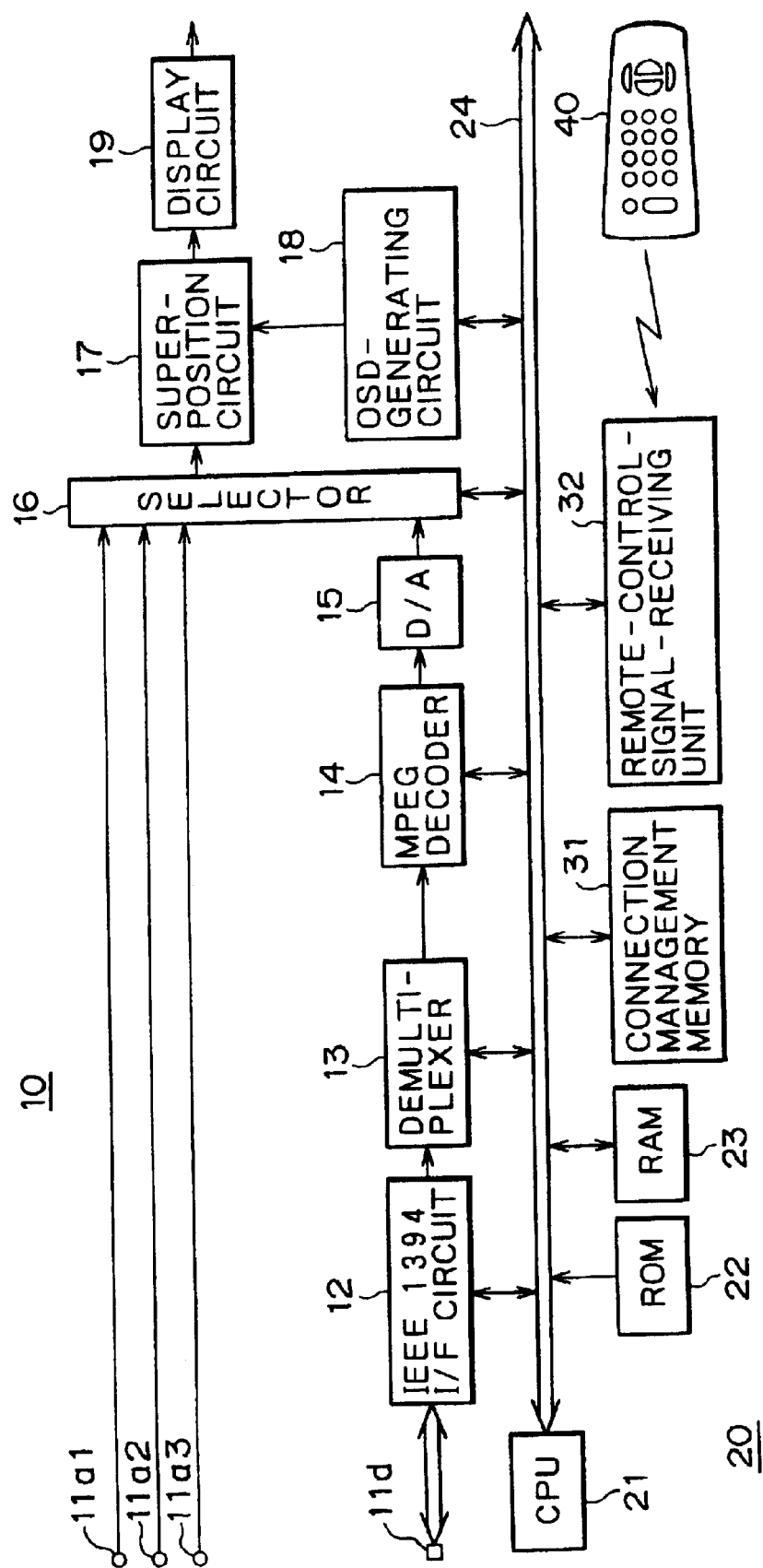
FIG. 3 is an explanatory block diagram showing a monitor apparatus used as an information-outputting apparatus implemented by an embodiment of the present invention.
Figure 4:
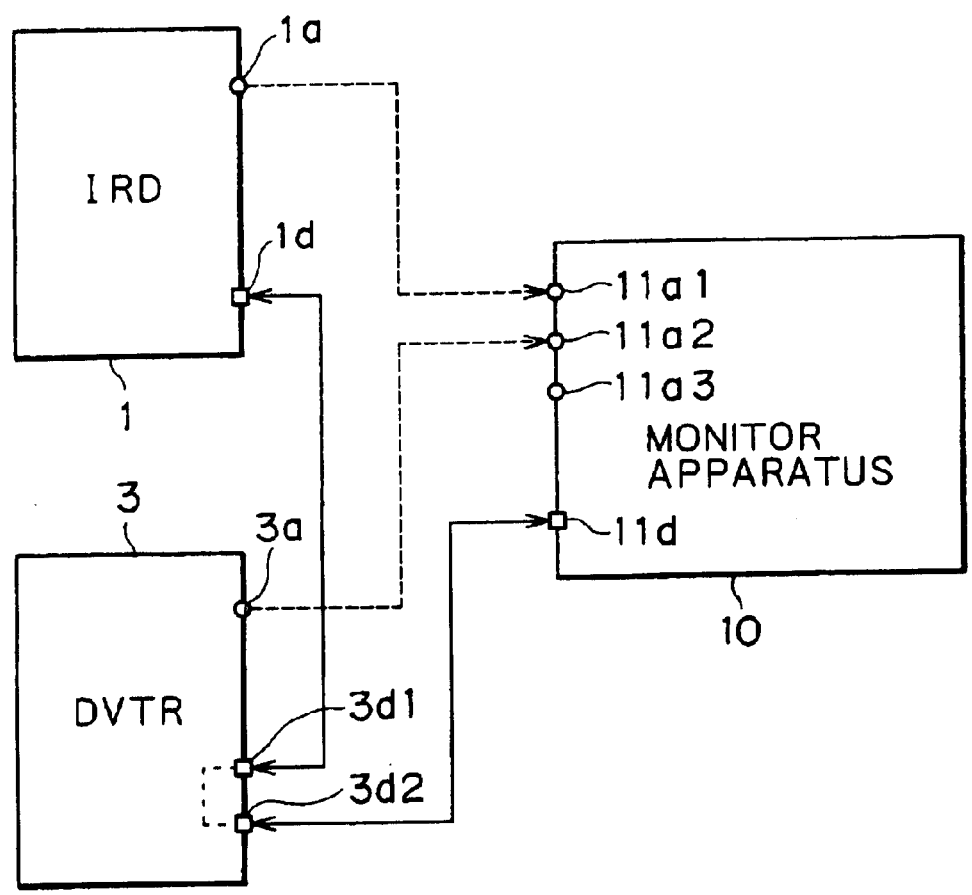
FIG. 4 is an explanatory diagram showing typical connections of the monitor apparatus shown in FIG. 3 with other electronic apparatuses.
Figure 5:
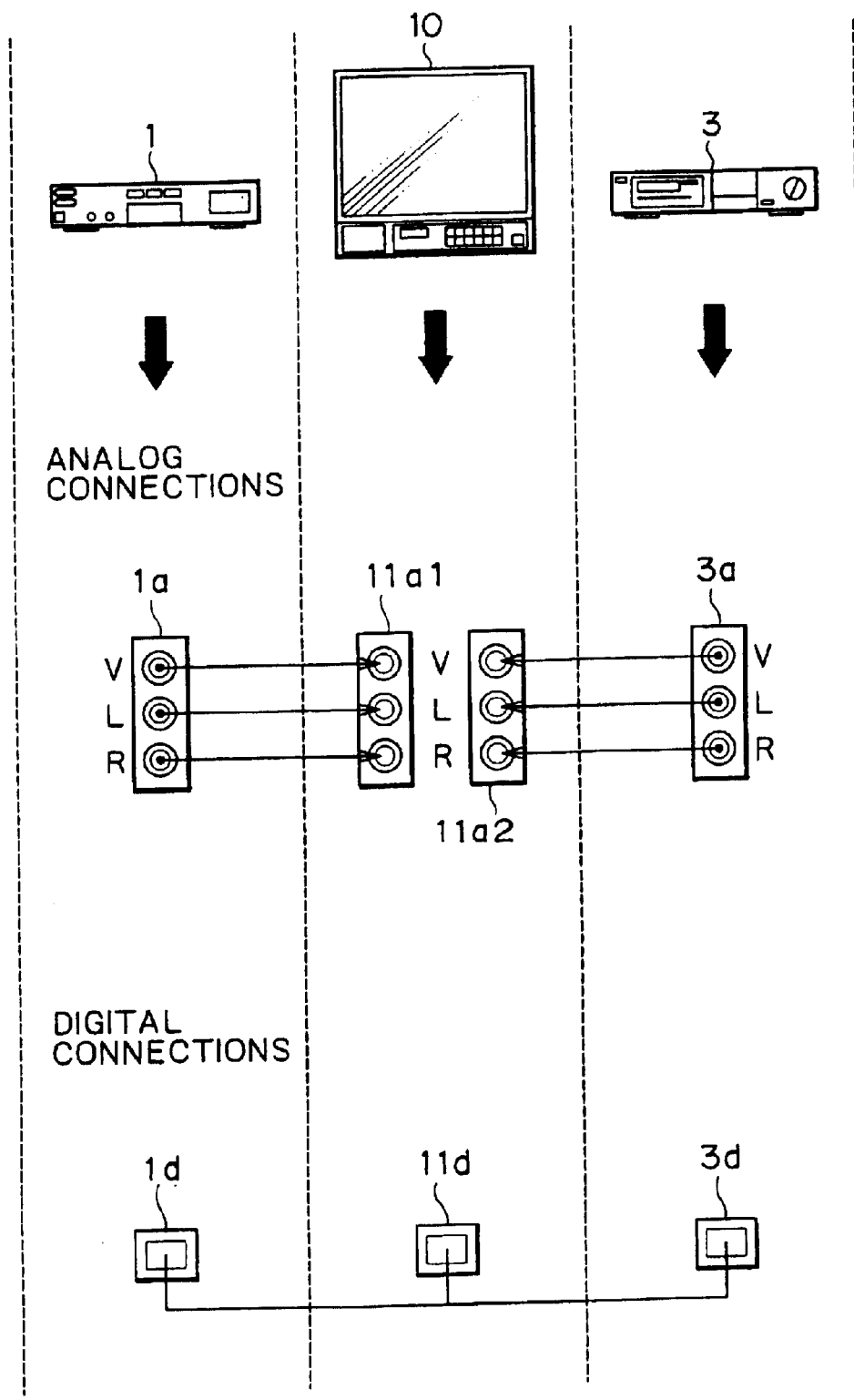
FIG. 5 is an explanatory diagram showing typical detailed connections of the monitor apparatus shown in FIG. 3 with other electronic apparatuses.

FIG. 3 is an explanatory block diagram showing a monitor apparatus 10 used as an information-outputting apparatus implemented by one of the embodiments of the present invention. FIG. 4 is an explanatory diagram showing typical connections of the monitor apparatus 10 shown in FIG. 3 with other electronic apparatuses whereas FIG. 5 is an explanatory diagram showing details of the typical connections of the monitor apparatus 10 shown in FIG. 3 with other electronic apparatuses. As shown in FIG. 3, the monitor apparatus 10 provided by this embodiment has 3 analog input terminals 11a1, 11a2 and 11a3 in addition to a digital I/O terminal 11d for a digital interface conforming to the IEEE 1394 standard.

Through the analog input terminals 11a1, 11a2 and 11a3 and the digital I/O terminal 11d, the monitor apparatus 10 is connected to a variety of electronic apparatuses by analog signal cables and a digital signal cable respectively. Before the configuration and the operation of the monitor apparatus 10 provided by this embodiment are explained, typical connections of the electronic apparatuses to the monitor apparatus 10 in this embodiment are described by referring to FIGS. 4 and 5.

The monitor apparatus 10 can be connected to an electronic apparatus for generating analog video and audio signals as well as to an electronic apparatus for generating digital video and audio signals. In this embodiment, the monitor apparatus 10 is connected to an IRD 1 by using analog and digital signal cables and to the DVTR 3 also by using analog and digital signal cables as shown in FIG. 4.

As described earlier, the IRD 1 is a receiver of digital broadcasts. In this embodiment, the IRD 1 is capable of receiving a digital television broadcast comprising a plurality of multiplexed television programs each encoded by adoption of an MPEG method.

To put it in more detail, the IRD 1 selectively receives a digital broadcast signal desired by the user in accordance with a command given by the user. The IRD 1 then extracts digital data of a desired television program from the selected digital broadcast signal and converts the extracted digital data into an analog signal. Finally, the IRD 1 outputs the analog signal to an analog output terminal 1a.

In addition, the IRD 1 is also capable of outputting and supplying the received and selected digital broadcast signal as it is through a digital I/O terminal 1d to typically recording apparatuses such as a DVTR, a camera and VTR integrated apparatus and a DVD recording and playback apparatus as well as an information-outputting apparatus such as the monitor apparatus 10 provided by this embodiment.

The DVTR 3 records a digital signal supplied thereto through a digital I/O terminal 3d1 or 3d2 onto a video tape as it is. In addition, the DVTR 3 also receives an analog signal supplied thereto by way of an analog input terminal not shown in the figure. The DVTR 3 then converts the analog signal into a digital signal and compresses the digital signal. Finally, the DVTR 3 encodes the compressed digital signal by adoption of an MPEG method in the case of this embodiment before recording the signal onto a video tape.

In addition, the DVTR 3 also has a function for receiving an analog television broadcast. The DVTR 3 converts a received analog television broadcast into a digital signal, then compresses the digital signal and, finally, records the compressed digital signal onto a video tape. As an alternative, the DVTR 3 outputs a received analog television broadcast to an analog output terminal 3a.

As shown in FIG. 4, in this embodiment, the analog output terminal 1a of the IRD 1 is connected to the analog input terminal 11a1 of the monitor apparatus 10. By the same token, the analog output terminal 3a of the DVTR 3 is connected to the analog input terminal 11a2 of the monitor apparatus 10. As for digital connections, the digital I/O terminal 1d of the IRD 1 is wired to a digital I/O terminal 3d1 of the DVTR 3 and a digital I/O terminal 3d2 of the DVTR 3 is wired to the digital I/O terminal 11d of the monitor apparatus 10.

As described above by referring to FIG. 4 and as shown also in FIG. 5, in this embodiment, the analog output terminal of the IRD 1 is connected to the analog input terminal of the monitor apparatus 10 on a one-to-one basis. By the same token, the analog output terminal of the DVTR 3 is connected to the analog input terminal of the monitor apparatus 10 also on a one-to-one basis. Since this embodiment adopts the digital interface conforming to the IEEE 1394 standard, on the other hand, the IRD 1, the DVTR 3 and the monitor apparatus 10 are digitally connected to each other by a single digital bus as is obvious from FIG. 5.

That is to say, in this embodiment, the IRD 1 is capable of exchanging digital data directly through the digital bus with the monitor apparatus 10. Similarly, the IRD 1 is capable of exchanging digital data directly through the same digital bus with the DVTR 3. Likewise, the DVTR 3 is capable of exchanging digital data directly through the same digital bus with the monitor apparatus 10.

FIG. 4 shows that, from the digital-connection point of view, the DVTR 3 seemingly exists between the IRD 1 and the monitor apparatus 10. Thus, the IRD 1 is not connected directly by a digital transmission line. As is obvious from FIG. 5, however, the digital interface conforming to the IEEE 1394 standard allows the electronic apparatuses 1, 3 and 10 to be connected to each other in the same way as the so-called bus-connected configuration. Thus, the IRD 1 is capable of exchanging digital data directly through the digital transmission line with the monitor apparatus 10 as described above.

That is to say, in the case of a digital interface conforming to the IEEE 1394 standard, an information signal of digital data is transmitted as packets by specifying the output destination serving as a recipient partner. This is because the output destination is designed to be capable of carrying out processing to receive only a packet destined for the output destination. In addition, in the case of a digital interface conforming to the IEEE 1394 standard, an electronic apparatus is capable of issuing a request for presentation of information to another electronic apparatus connected to the same digital bus.

That is to say, the digital interface conforming to the IEEE 1394 standard allows an electronic apparatus to transmit video and audio signals as packets of an information signal to a target output destination, and to receive only packets destined for the electronic apparatus. The digital interface conforming to the IEEE 1394 standard also allows an electronic apparatus to exchange a variety of control-signal packets each used to make a request for a supply of a desired information signal such as audio and video signals.

It should be noted that, as shown in FIGS. 3 and 4, one of the analog input terminals 11a1 to 11a3 provided on the monitor apparatus 10, that is, the analog input terminal 11a3, is not connected to any electronic apparatus. That is to say, the analog input terminal 11a3 provided on the monitor apparatus 10 is available. That is why FIG. 5 does not show the unused analog input terminal 11a3.

As described above, this embodiment is used to exemplify a case in which the monitor apparatus 10 is connected to the IRD 1 by using analog and digital signal cables and to the DVTR 3 also by using analog and digital signal cables. As shown in FIG. 3, analog video signals supplied to the monitor apparatus 10 by way of the analog input terminals 11a1, 11a2 and 11a3 are fed to a selector 16. On the other hand, digital data compressed by adoption of the MPEG method, destined for the monitor apparatus 10 and supplied to the monitor apparatus 10 by way of the digital I/O terminal 11d is fed to an IEEE 1394 I/F circuit 12. A signal output by the IEEE 1394 I/F circuit 12 is supplied to a demultiplexer 13.

The IEEE 1394 I/F circuit 12 extracts, among other data, control information and information on an electronic apparatus serving as a source generating the digital data destined for the monitor apparatus 10 from a packet of the digital data or, to be more specific, from the header of the packet. The extracted information is supplied to a control unit 20.

The digital data supplied to the demultiplexer 13 may comprise a plurality of broadcast programs and an EPG (Electronic Program Guide). In this case, the demultiplexer 13 extracts one of the broadcast programs indicated by a command entered by the user or the EPG, supplying the broadcast program or the EPG to an MPEG decoder 14. The command entered by the user is a command to select a desired broadcast program. The command is interpreted by the control unit 20, which outputs a control signal to the demultiplexer 13.

As shown in FIG. 3, the control unit 20 employed in the monitor apparatus 10 is a microcomputer comprising a CPU 21, a ROM 22 and a RAM 23, which are connected to each other by a CPU bus 24. The control unit 20 controls components employed in the monitor apparatus 10. The ROM 22 is used for storing a variety of programs to be executed by the CPU 21 and various kinds of data required in processing of the control unit 20. The RAM 23 serves mainly as a work area for various kinds of processing.

The MPEG decoder 14 carries out processing to decompress digital data such as a broadcast program supplied thereto in order to restore digital data prior to compression. This processing is referred to as MPEG decoding. The restored digital data is supplied to a D/A conversion unit 15 for converting the digital data into an analog video signal which is then supplied to the selector 16.

As described above, analog video signals supplied to the monitor apparatus 10 by way of the analog input terminals 11a1, 11a2 and 11a3 are fed directly to the selector 16 while a digital signal supplied to the monitor apparatus 10 through the digital I/O terminal 11d is supplied to the selector 16 by way of the MPEG decoder 14 for decompressing the digital signal and the D/A conversion unit 15 for converting the decompressed digital signal into an analog signal. Controlled by the control unit 20, the selector 16 selects one of the analog video signals supplied to the monitor apparatus 10 by way of the analog input terminals 11a1, 11a2 and 11a3 or the digital signal supplied to the monitor apparatus 10 through the digital I/O terminal 11d.

To put it in detail, the user enters a command via a remote commander 40. The command indicates which of the analog video signals supplied to the monitor apparatus 10 by way of the analog input terminals 11a1, 11a2 and 11a3 and the digital signal supplied to the monitor apparatus 10 trough the digital I/O terminal 11d is to be displayed. The remote commander 40 generates a remote control signal such as an infrared ray signal in accordance with the command entered by the user. The remote control signal is received by a remote-control-signal-receiving unit 32 connected to the control unit 20 and then supplied to the control unit 20. The control unit 20 then forms a control signal according to the command entered by the user and outputs the control signal to the selector 16.

The selector 16 selects one of the analog video signals supplied to the monitor apparatus 10 by way of the analog input terminals 11a1, 11a2 and 11a3 or the digital signal supplied to the monitor apparatus 10 trough the digital I/O terminal 11d, outputting the selected signal to a superposition circuit 17. The superposition circuit 17 also receives display data or OSD (On Screen Display) data from an OSD-generating circuit 18.

The OSD data is various kinds of display information to be displayed by superposition on a video display. Examples of the OSD data are a channel number, which is displayed when a channel is called by the user, a volume bar showing a volume level at volume adjustment and a variety of messages. The OSD-generating circuit 18 generates OSD data in accordance with a control signal received from the control unit 20.

The superposition circuit 17 superposes display information, that is, OSD data of an OSD message received from the OSD-generating circuit 18, on a video signal received from the selector 16. The superposition circuit 17 then supplies the video signal with the OSD message superposed thereon to a display circuit 19. The display circuit 19 generates a signal to be supplied to a display unit from the video signal received from the superposition circuit 17. The display unit is typically a CRT employed in the monitor apparatus 10. As a result, a video display according to a video signal received from a terminal selected by the selector 16 appears on the display screen of the display unit.

As described above, in this embodiment, the monitor apparatus 10 is connected to the IRD1 and the DVTR 3 by using a common digital bus and separate analog signal cables so that the monitor apparatus 10 is capable of receiving digital and analog signals from both the IRD 1 and the DVTR 3. With a digital connection coexisting with analog connections in this way, the monitor apparatus 10 may receive digital and analog signals alternately from the same electronic apparatus.

Assuming that, initially, the DVTR 3 connected to the monitor apparatus 10 as shown in FIGS. 4 and 5 reads out a digital content compressed by adoption of the MPEG method from a video tape and supplies the content to the monitor apparatus 10 by way of the digital I/O terminal 3d2, the user enters a command to supply an analog video signal of an analog television broadcast program, which is received and demodulated by a function of the DVTR 3 for receiving an analog broadcast.

In such a case, the monitor apparatus 10 must switch the reception of a signal from the digital I/O terminal 11d connected to the digital I/O terminal 3d of the DVTR 3 to the analog input terminal 11a2 for receiving the analog video signal from the DVTR 3. However, users other than the person doing actual installation to connect the electronic apparatuses to each other do not know which analog input terminal of the monitor apparatus 10 is connected to the IRD 1 and which analog input terminal of the monitor apparatus 10 is connected to the DVTR 3. Even the person doing actual installation to connect the electronic apparatuses to each other is not aware of the connection status of the monitor apparatus 10 with the other electronic apparatuses.

That is why it is difficult for the user of the monitor apparatus 10 to quickly and correctly select an analog input terminal of the monitor apparatus 10 connected to the DVTR 3 and switch from the digital I/O terminal 11d to the selected analog input terminal for receiving an analog signal from the DVTR 3 when the DVTR 3 is driven to switch its output signal from a digital signal to the analog signal as is described above.

In order to solve the problem described above, the monitor apparatus 10 implemented by this embodiment is provided with a digital interface conforming to the IEEE 1394 standard for detecting pieces of peculiar information each assigned to one of electronic apparatuses connected to the monitor apparatus 10 by the common digital bus. The pieces of peculiar information are each associated with one of the analog input terminals 11a1, 11a2 and 11a3 of the monitor apparatus 10 connected to an electronic apparatus, to which the piece of information is assigned, in an analog-connection management table. The analog-connection management table is stored in a connection management memory 31 connected to the control unit 20.

Each entry in the analog-connection management table is an association of a piece of peculiar information assigned to an electronic apparatus connected to the monitor apparatus 10 by the common digital bus with an analog input terminal of the monitor apparatus connected to the electronic apparatus. The monitor apparatus 10 uses the analog-connection management table for managing status of analog connections of the monitor apparatus 10.

To put it concretely, when the power supply of the monitor apparatus 10 is turned on, the monitor apparatus 10 forms a judgment as to whether or not an analog-connection management table has been created in a connection management memory 31 connected to the control unit 20. If the outcome of the judgment indicates that an analog-connection management table has not been created in the connection management memory 31, an operation to create such a table is started.

First of all, the control unit 20 controls the IEEE 1394 I/F circuit 12 to issue an inquiry about SDD (Self Describing Devices) information defined in the digital interface conforming to the IEEE 1394 standard to each electronic apparatus connected to the monitor apparatus 10 by using the digital bus, which also conforms to the IEEE 1394 standard. The inquiry is transmitted to all the electronic apparatuses through the digital bus. The SDD information is various kinds of data such as the name of a manufacturer making the electronic apparatus, the product category of the electronic apparatus and the type of the electronic apparatus.

The IEEE 1394 I/F circuit 12 employed by the monitor apparatus 10 then detects the SDD information transmitted by the IRD 1 and the DVTR 3, which are connected to the monitor apparatus 10 by using the digital bus, in response to the inquiry, and extracts information identifying the IRD 1 and the DVTR 3 from the detected SDD information. In the case of this embodiment, the IEEE 1394 I/F circuit 12 extracts the name of a manufacturer making the IRD 1, the product category of the IRD 1 and the type of the IRD 1 from the detected SDD information. By the same token, the IEEE 1394 I/F circuit 12 extracts the name of a manufacturer making the DVTR 3, the product category of the DVTR 3 and the type of the DVTR 3 from the detected SDD information. Then, the IEEE 1394 I/F circuit 12 supplies the manufacturer names and the product categories to the control unit 20.

The control unit 20 temporarily stores the manufacturer names and the product categories of the IRD 1 and the DVTR 3 received from the IEEE 1394 I/F circuit 12 typically in the RAM 23. In the monitor apparatus 10 provided by this embodiment, the monitor apparatus 10 displays the manufacturer names and the product categories of the IRD 1 and the DVTR 3 stored in the RAM 23 on the screen of the display unit employed in the monitor apparatus 10. Through the screen, the user is informed of each electronic apparatus connected to the monitor apparatus 10 by using the digital bus and most likely also using an analog signal cable, or each electronic apparatus connected to the monitor apparatus 10 most likely by using an analog signal cable in the form of a display on the screen of the display unit.

Electronic apparatuses each connected to the monitor apparatus 10 most likely through an analog input terminal or most likely by using an analog signal cable are candidates, one of which will be selected by the user. By looking at the display of the candidates on the screen, the user is thus capable of selecting an electronic apparatus most likely connected to the monitor apparatus 10 through an analog input terminal of the monitor apparatus 10.

As described earlier by referring to FIGS. 4 and 5, in this embodiment, the IRD 1 and the DVTR 3 are connected respectively to the analog input terminals 11a1 and 11a2 of the monitor apparatus 10. Thus, the user of the monitor apparatus 10 is capable of identifying an analog input terminal of the monitor apparatus 10 connected to any electronic apparatus.

Figures 6, 7:
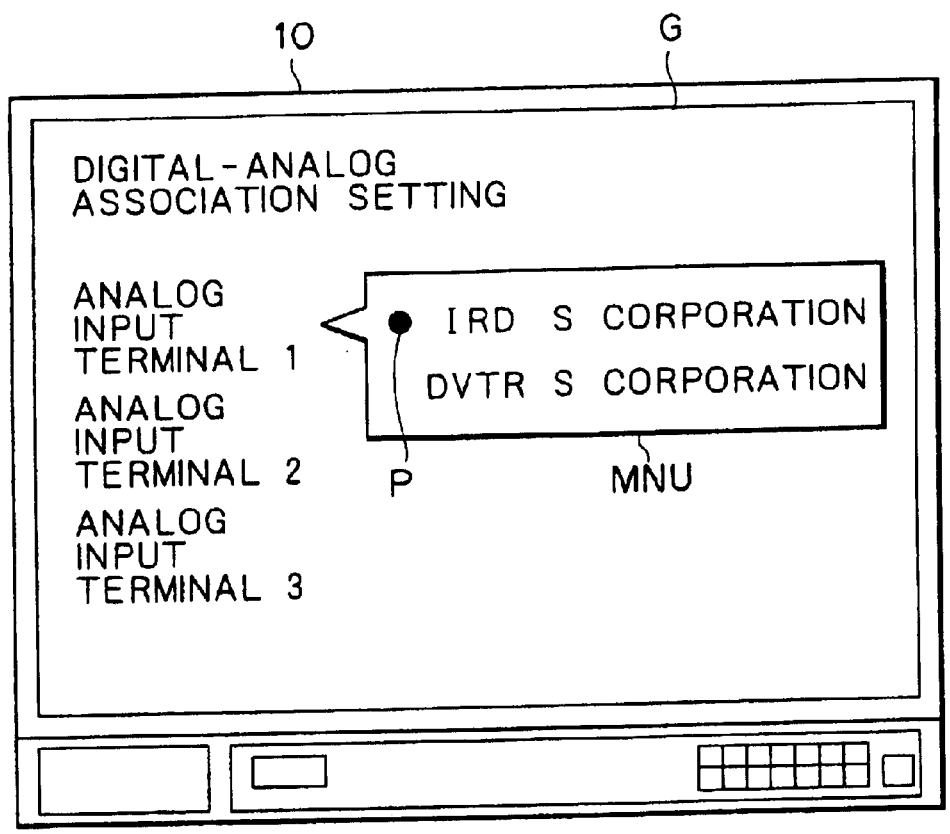
FIG. 6 is an explanatory diagram showing a typical apparatus-information-notifying, selecting and setting screen displayed by the monitor apparatus shown in FIG. 3.
FIG. 7 is an explanatory diagram showing a typical analog-connection management table of the monitor apparatus shown in FIG. 3.

FIG. 6 is an explanatory diagram showing a typical apparatus-information-notifying, selecting and setting screen displayed by the monitor apparatus 10. Through this apparatus-information-notifying, selecting and setting screen, the user is informed of candidates, each of which is to be associated by the user as an electronic apparatus most likely connected to an analog input terminal of the monitor apparatus 10 with the terminal to create an analog-connection management table like the one shown in FIG. 7. The user can later utilize the analog-connection management table to select an analog input terminal for a desired electronic apparatus.

To put it in more detail, the monitor apparatus 10 provided by this embodiment obtains pieces of information each peculiar to an electronic apparatus connected to the monitor apparatus 10 by the digital bus conforming to the IEEE 1394 standard for all such electronic apparatuses. The monitor apparatus 10 stores the peculiar information in the RAM 23 temporarily. The control unit 20 supplies data required for generating the apparatus-information-notifying, selecting and setting screen shown in FIG. 6 to the OSD-generating circuit 18. It is needless to say that the data includes the peculiar information stored in the RAM 23 temporarily.

The OSD-generating circuit 18 generates OSD data for creating the apparatus-information-notifying, selecting and setting screen shown in FIG. 6 from the data received from the control unit 20 and supplies the OSD data to the superposition circuit 17. The superposition circuit 17 superposes display information based on the OSD data received from the OSD-generating circuit 18 on a video signal received from the selector 16 and supplies the video signal with the display information superposed thereon to the display unit employed in the monitor apparatus 10 by way of the display circuit 19. In this case, the display information is the apparatus-information-notifying, selecting and setting screen shown in FIG. 6.

As a result, the apparatus-information-notifying, selecting and setting screen shown in FIG. 6 appears on the screen G of the display unit employed in the monitor apparatus 10. As shown in FIG. 6, in this embodiment, the apparatus-information-notifying, selecting and setting screen is a table of 3 analog input terminals of the monitor apparatus 10 each associated with information peculiar to an electronic apparatus connected most likely to the terminal. In this typical apparatus-information-notifying, selecting and setting screen, the peculiar information is the product category and the manufacturer name of the electronic apparatus. The pieces of peculiar information are items of a select menu MNU used by the user for associating an electronic apparatus most likely connected to an analog input terminal of the monitor apparatus 10 with the terminal.

The select menu MNU includes a select specifier P as shown in FIG. 6. In the case of this embodiment, the select specifier P can be moved to the head of a piece of peculiar information displayed on the apparatus-information-notifying, selecting and setting screen as a good candidate for a most likely connected electronic apparatus in accordance with a command entered by the user via the remote commander 40 for the monitor apparatus 10. In the case of the typical apparatus-information-notifying, selecting and setting screen shown in FIG. 6, the select specifier P can be moved to a position in front of the product category of the IRD 1 or the DVTR 3.

The monitor apparatus 10 associates an analog input terminal pointed to by the select menu MNU with an electronic apparatus, the product category and the manufacturer name of which are indicated by the select specifier P in the select menu MNU. In the screen shown in FIG. 6, analog input terminal 1 is associated with the IRD 1. The select menu MNU is then moved to point to another analog input terminal to associate this other terminal with another electronic apparatus. This operation is repeated to create an analog-connection management table like the one shown in FIG. 7.

Thus, as described above, by operating the remote commander 40 for the monitor apparatus 10, the user is capable of moving the select specifier P to a position in front of the product category of a most likely connected electronic apparatus. Then, as the user presses a confirmation key on the remote commander 40, the selection of the most likely connected electronic apparatus is confirmed and the association of the electronic apparatus with an analog input terminal pointed to by the select menu MNU is set.

When the user confirms the selection of an electronic apparatus most likely connected to an analog input terminal of the monitor apparatus 10 as described above, the control unit 20 employed in the monitor apparatus 10 stores the association of the analog input terminal pointed to by the select menu MNU with information peculiar to an electronic apparatus most likely connected to the analog input terminal, that is, the product category and the name of a manufacturer making the electronic apparatus, in the connection management memory 31.

In the case of this embodiment, the monitor apparatus 10 has the 3 analog input terminals 11a1, 11a2 and 11a3. Thus, the selection of an electronic apparatus and the confirmation of the selection described above are carried out for each of the 3 analog input terminals 11a1, 11a2 and 11a3 to create an analog-connection management table like the one shown in FIG. 7 in the connection management memory 31.

It should be noted that, in the process of creating an analog-connection management table, already selected information peculiar to an electronic apparatus can be prevented from appearing on the select menu MNU and an analog input terminal already associated with the information can be prevented from appearing on the apparatus-information-notifying, selecting and setting screen. As an alternative, instead of preventing already selected information and an analog input terminal already associated with the information from being displayed, a mark can be added to the selected information and the associated electronic apparatus so that the user will not select and associate them again by mistake.

FIG. 7 is an explanatory diagram showing a typical analog-connection management table created for the monitor apparatus 10 provided by the present invention in the connection management memory 31. Input terminals 1, 2 and 3 shown in FIG. 7 correspond to the analog input terminals 11a1, 11a2 and 11a3 of the monitor apparatus 10 respectively.

As shown in FIG. 7, the IRD 1 made by a manufacturer, S corporation, is connected to the analog input terminal 11a1 or input terminal 1 of the monitor apparatus 10 by using an analog signal cable and the DVTR 3 also made by the manufacturer, S corporation, is connected to the analog input terminal 11a2 or input terminal 2 of the monitor apparatus 10 by using an analog signal cable. The monitor apparatus 10 executes management of analog connections based on this analog-connection management table.

As described above, in this embodiment, the monitor apparatus 10 has the 3 analog input terminals 11a1, 11a2 and 11a3 and, as explained earlier by referring to FIGS. 4 and 5, the IRD 1 and the DVTR 3 are connected respectively to the analog input terminals 11a1 and 11a2 of the monitor apparatus 10 by separate analog cables as well as by a common digital cable. The analog input terminal 11a3 or input terminal 3 shown in FIG. 7 is not connected to any electronic apparatus.

By having the analog-connection management table of FIG. 7 stored in the connection management memory 31, the monitor apparatus 10 is capable of putting connections of the IRD 1 and the DVTR 3 connected to the monitor apparatus 10 by the digital signal cable to the analog input terminals of the monitor apparatus 10 under control. That is to say, the monitor apparatus 10 is capable of putting connections of the IRD 1 and the DVTR 3 to the analog input terminals managed by associating the IRD 1 and the DVTR 3 with their respective analog input terminals 11a1 and 11a2.

The user of the monitor apparatus 10 is allowed to enter a command to request the monitor apparatus 10 to display the analog-connection management table created typically by the user in the connection management memory 31 included in the monitor apparatus 10 on the screen of the display unit employed in the monitor apparatus 10. From the displayed analog-connection management table, the user of the-monitor 10 is capable of simply and reliably knowing which analog input terminal of the monitor apparatus 10 an electronic apparatus of interest is connected to. As a result, the user is capable of selecting an analog input terminal for receiving an analog signal from a desired electronic apparatus quickly and with a high degree of reliability.

As described above, the IRD 1 and the DVTR 3, which are both connected to the monitor apparatus 10 by separate analog signal cables as well as by a common digital bus, may each supply analog and digital signals alternately to the monitor apparatus 10. Even in this case, by having the analog-connection management table shown FIG. 7, the monitor apparatus 10 is capable of automatically selecting a correct analog input terminal when the IRD 1 or the DVTR 3 switches its output from a digital signal to an analog signal.

FIGS. 8A, 8B and 8C are explanatory diagrams used for describing automatic terminal-switching operations carried out by the monitor apparatus 10 in a case wherein the DVTR 3 connected to the monitor apparatus 10 by an analog signal cable and the digital bus is supplying digital and analog signals to the information-outputting apparatus 10 alternately as described above.

In accordance with a command issued by the user, the control unit 20 employed in the monitor apparatus 10 controls the IEEE 1394 I/F circuit 12 to issue a request for transmission of digital data to the DVTR 3, and to receive the digital data transmitted by the DVTR 3 in response to the request. At the same time, the control unit 20 actuates the selector 16 to output a video signal supplied by the IEEE 1394 I/F circuit 12 to the selector 16 by way of the demultiplexer 13 and the MPEG decoder 14 and the D/A conversion circuit 15 as shown symbolically by a connection to the digital input terminal 11d in FIG. 8A. As a result, a video display of the digital data transmitted by the DVTR 3 appears on the screen of the display unit employed in the monitor apparatus 10.

At that time, the control unit 20 employed in the monitor apparatus 10 provided by this embodiment is capable of identifying the electronic apparatus that serves as a source supplying the digital data. In this example, the electronic apparatus that serves as a source supplying the digital data is the DVTR 3. To put it in detail, the monitor apparatus 10 extracts information peculiar to the DVTR 3 from the digital data and uses the extracted peculiar information to search the analog-connection management table stored in the connection management memory 31 for an entry corresponding to the information. In this case, the entry is an association of the peculiar information with the DVTR 3 and the analog input terminal 11a2, which is connected to the DVTR 3.

As described above, the monitor apparatus 10 is also connected to the DVTR 3 and the IRD 1 through a digital interface conforming to the IEEE 1394 standard. In this case, digital data or an information signal is transmitted from the DVTR 3 or the IRD 1 as packets each specifying an output destination to serve as a recipient of the digital data. The output destination receives and processes only packets destined for the destination. In this embodiment, the monitor apparatus 10 is the output destination. The IEEE 1394 I/F circuit 12 employed in the monitor apparatus 10 forms a judgment as to whether or not the DVTR 3 or the IRD 1 is transmitting a digital signal destined for the monitor apparatus 10 and supplies the outcome of the judgment to the control unit 20.

Figure 8:
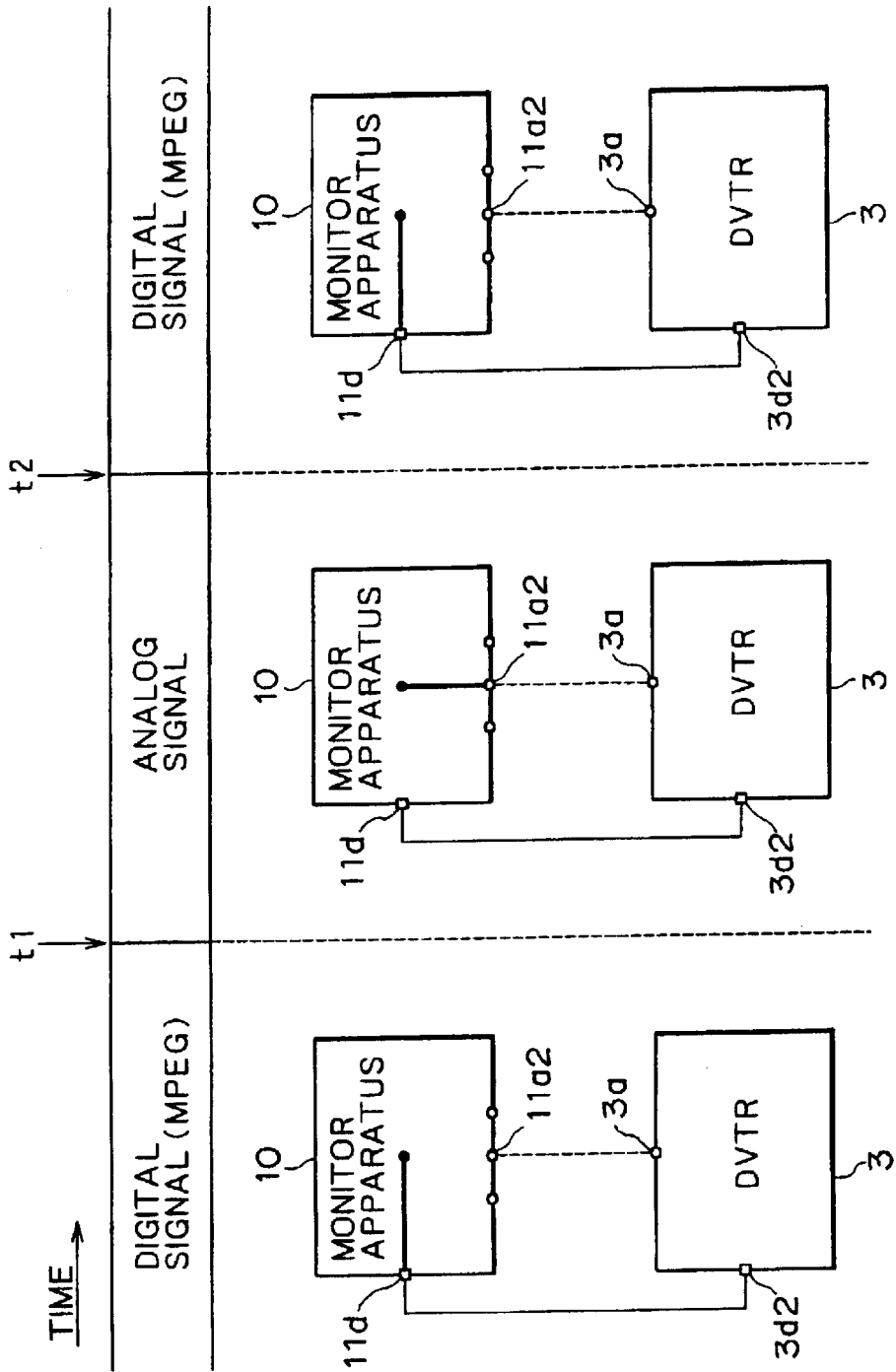
FIGS. 8A, 8B and 8C are explanatory diagrams used for describing automatic terminal-switching operations carried out in a case wherein an electronic apparatus is supplying digital and analog signals to the information-outputting apparatus alternately.

At a point of time t1 shown in FIG. 8, the DVTR 3 halts an operation to read out digital data encoded by adoption of the MPEG method from a video tape, process the digital data and output the processed data. Instead, the DVTR 3 receives an analog television broadcast signal by using a reception function, demodulates the analog signal and outputs the demodulated analog signal. At that time, the monitor apparatus 10 no longer receives digital data. Thus, the outcome of the judgment formed by the IEEE 1394 I/F circuit 12 employed in the monitor apparatus 10 indicates that no digital signal is received. The outcome of the judgment is supplied from the IEEE 1394 I/F circuit 12 to the control unit 20.

At that time, already identifying the analog input terminal 11a2 as a terminal of the monitor apparatus 10 connected to the DVTR 3 from the analog-connection management table of FIG. 7 stored in the connection management memory 31 as described earlier, the control unit 20 employed in the monitor apparatus 10 actuates the selector 16 to output the analog video signal received from the DVTR 3 by way of the analog input terminal 11a2 as symbolically indicated by a connection to the terminal 11a2 in FIG. 8B. As a result, a video display of the analog video signal received from the DVTR 3 automatically appears on the screen of the display unit employed in the monitor apparatus 10, replacing a video display of the digital signal supplied by the DVTR 3 so far.

As the operation of the DVTR 3 to supply a digital signal to the monitor apparatus 10 is resumed at a point of time t2 shown in FIG. 8, the outcome of the judgment formed by the IEEE 1394 I/F circuit 12 employed in the monitor apparatus 10 indicates that the monitor apparatus 10 is receiving the digital signal from the DVTR 3. The outcome of the judgment is supplied from the IEEE 1394 I/F circuit 12 to the control unit 20 employed in the monitor apparatus 10.

Informed that the monitor apparatus 10 is receiving the digital signal from the DVTR 3, the control unit 20 controls the IEEE 1394 I/F circuit 12 to receive the digital signal from the DVTR 3, and actuates the selector 16 to output a video signal supplied by the IEEE 1394 I/F circuit 12 to the selector 16 by way of the demultiplexer 13, the MPEG decoder 14 and the D/A conversion circuit 15 as shown symbolically by a connection to the digital input terminal 11d in FIG. 8C. As a result, a video display of the digital data transmitted by the DVTR 3 again appears on the screen of the display unit employed in the monitor apparatus 10.

As described above, when an electronic apparatus, which has been supplying a digital signal to the monitor apparatus 10 so far, discontinues the operation to supply the digital signal and starts outputting an analog signal to the monitor apparatus 10, by using the analog-connection management table of FIG. 7 created in the connection management memory 31 in the monitor apparatus 10, the monitor apparatus 10 is capable of automatically receiving and processing the analog signal newly supplied by the electronic apparatus upon the discontinuation of the operation to supply the digital signal without a need for the user to manually switch the signal supply route to the monitor apparatus 10 from a digital-signal route to an analog-signal route by itself. As the electronic apparatus resumes the operation to supply a digital signal, the monitor apparatus 10 is capable of receiving and processing the digital signal by automatically switching the input terminal from an analog input terminal to a digital I/O terminal.

That is to say, by virtue of the analog-connection management table of FIG. 7 created in the connection management memory 31, an electronic apparatus connected to the monitor apparatus 10 by an analog signal cable and the digital bus to serve as a source of an information signal supplied to the monitor apparatus 10 through either the analog signal cable or the digital bus is capable of supplying an information signal to the monitor apparatus 10 through the analog or digital interface. On the other hand, the monitor apparatus 10, that is, an electronic apparatus serving as an output destination or a recipient of the information signal or an information-outputting apparatus for processing and outputting the information signal, is capable of switching the input terminal from an analog input terminal to a digital I/O terminal or vice versa in accordance with the type of the information signal supplied to the monitor apparatus 10.

While the above description explains a case in which the DVTR 3 supplies digital and analog signals to the monitor apparatus 10 alternately, the IRD 1 may also supply digital and analog signals to the monitor apparatus 10 alternately. In the latter case, when the IRD 1, which has been supplying a digital signal to the monitor apparatus 10 so far, discontinues the operation to supply the digital signal and starts outputting an analog signal to the monitor apparatus 10, by using the analog-connection management table of FIG. 7 created in the connection management memory 31 in the monitor apparatus 10, the monitor apparatus 10 is capable of automatically receiving and processing the analog signal newly supplied by the IRD 1 upon the discontinuation of the operation to supply the digital signal. As the IRD 1 resumes the operation to supply a digital signal, the monitor apparatus 10 is capable of receiving and processing the digital signal by automatically switching the input terminal from an analog input terminal to a digital I/O terminal.

Figure 9:
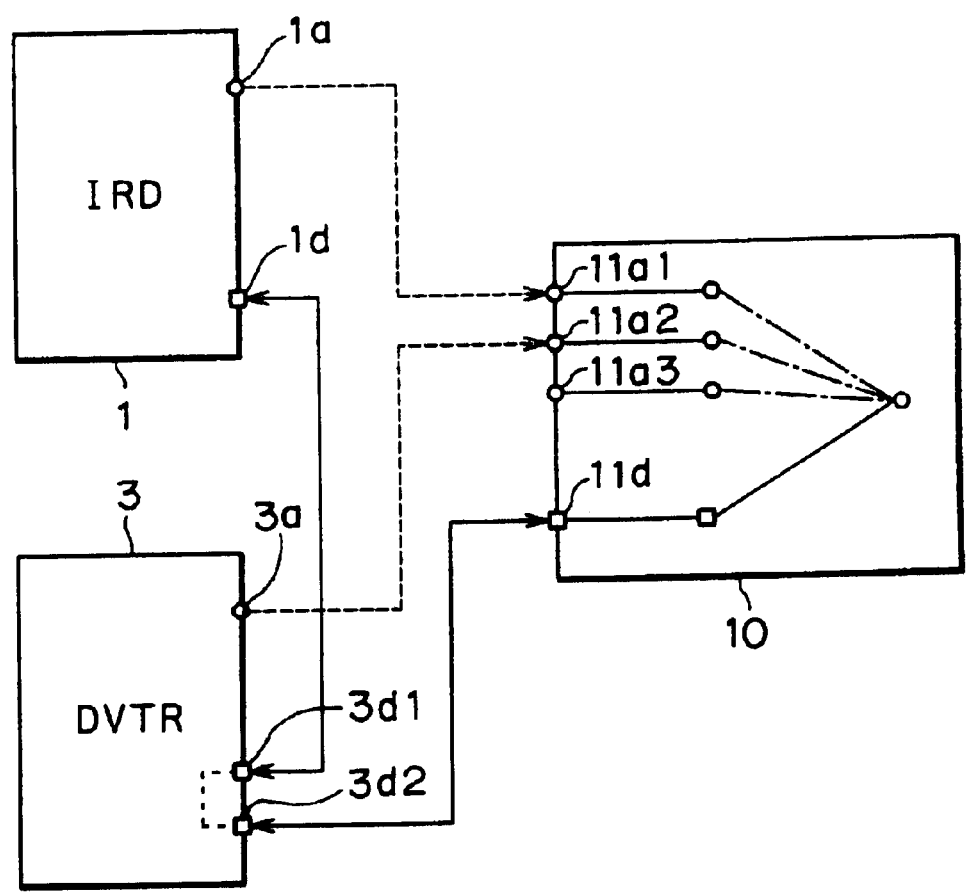
FIG. 9 is an explanatory diagram used for describing automatic terminal-switching operations carried out in a case wherein digital and analog signals are supplied alternately.

FIG. 9 is an explanatory diagram used for describing automatic terminal-switching operations carried out in the aforementioned case wherein digital and analog signals are supplied alternately, assuming that the monitor apparatus 10 is processing a digital signal received from a desired electronic apparatus through the digital I/O terminal 11d provided on the monitor apparatus 10 as shown in FIG. 9.

Then, when the electronic apparatus halts the operation to supply the digital signal to the monitor apparatus 10 and starts supplying an analog signal thereto, the monitor apparatus 10 is capable of carrying out a terminal-switching operation based on the analog-connection management table created in the connection management memory 31 so as to receive the analog signal newly supplied by the electronic apparatus, which has been generating the digital signal so far, through an analog signal cable represented by a dashed line in FIG. 9.

If the DVTR 3 is the electronic apparatus, which has been generating a digital signal so far, when the DVTR 3 halts the operation to supply the digital signal to the monitor apparatus 10 by way of the digital I/O terminal 11d and starts supplying an analog signal thereto, the monitor apparatus 10 is capable of automatically selecting the analog input terminal 11a2 for receiving the analog signal to be processed therein. If the IRD 1 is the electronic apparatus, which has been generating a digital signal so far, on the other hand, the monitor apparatus 10 is capable of automatically carrying out a terminal-switching operation for selecting the analog input terminal 11a1 to receive an analog signal to be processed therein when the IRD 1 halts the operation to supply the digital signal to the monitor apparatus 10 and starts supplying the analog signal thereto. Then, as the operation to supply a digital signal is resumed, the monitor apparatus 10 is capable of automatically carrying out a terminal-switching operation to switch back to the digital I/O terminal 11d for receiving the digital signal.

Even though this embodiment is used to exemplify a case in which the monitor apparatus 10 is connected only to the IRD 1 and the DVTR 3, the present invention can also be applied to a case wherein the monitor apparatus 10 is connected to a number of electronic apparatuses by using a digital bus common to the electronic apparatuses and a separate analog signal cable for each of the electronic apparatuses.

[Timing to Create an Analog-connection Management Table]

In the embodiment described, when the analog-connection management table is found non-existent in the connection management memory 31 at the time the power supply of the monitor 10 is turned on, the monitor apparatus 10 carries out a series of operations to create an analog-connection management table. To put it in detail, the monitor apparatus 10 issues an inquiry about information peculiar to an electronic apparatus to each electronic apparatus connected to the monitor apparatus 10 by using the digital bus. Each electronic apparatus reports information peculiar thereto to the monitor apparatus 10 in response to the enquiry. Each pair of an electronic apparatus and the information peculiar to the electronic apparatus is then associated with an analog input terminal most likely connected to the electronic apparatus to form an entry of the analog-connection management table being created. It should be noted, however, that the timing to create an analog-connection management table is not limited to the detection of the non-existence of the analog-connection management table at the power-on time described above.

When the user removes an electronic apparatus connected to the monitor apparatus 10 by the digital bus from the network, adds a new electronic apparatus connected to the monitor apparatus 10 by the digital bus to the network, removes an electronic apparatus connected to the monitor apparatus 10 by an analog signal cable from the network or adds a new electronic apparatus connected to the monitor apparatus 10 by an analog signal cable to the network, for example, the user is allowed to enter a command typically via the remote commander 40 to issue a request for creation of an analog-connection management table to the monitor apparatus 10. In response to this command, the monitor apparatus 10 starts the series of operations to create an analog-connection management table as described above.

As an alternative, the monitor apparatus 10 is designed to detect a change in analog or digital connection. In this case, the monitor apparatus 10 starts the series of operations to create an analog-connection management table as described above when a change in analog or digital connection is detected.

That is to say, in a network comprising electronic apparatuses connected to each other by using a digital bus conforming to the IEEE 1394 standard, when the user disconnects one of the electronic apparatuses from the network or adds a new electronic apparatus by the digital bus to the network, the change in connection is detected and a topology (or a connection configuration) is constructed anew.

Thus, in a network comprising electronic apparatuses connected to each other by using a digital bus conforming to the IEEE 1394 standard, when the user disconnects one of the electronic apparatuses from the network or adds a new electronic apparatus to the network, each of the electronic apparatuses is informed of the change in connection. Informed of the change in connection, the IEEE 1394 I/F circuit 12 employed in the monitor apparatus 10 notifies the control unit 20 that the change has been made to the network.

When the IEEE 1394 I/F circuit 12 employed in the monitor apparatus 10 notifies the control unit 20 that the change has been made to the network as described above, the control unit 20 starts the series of operations to create an analog-connection management table as described above.

Figure 10:
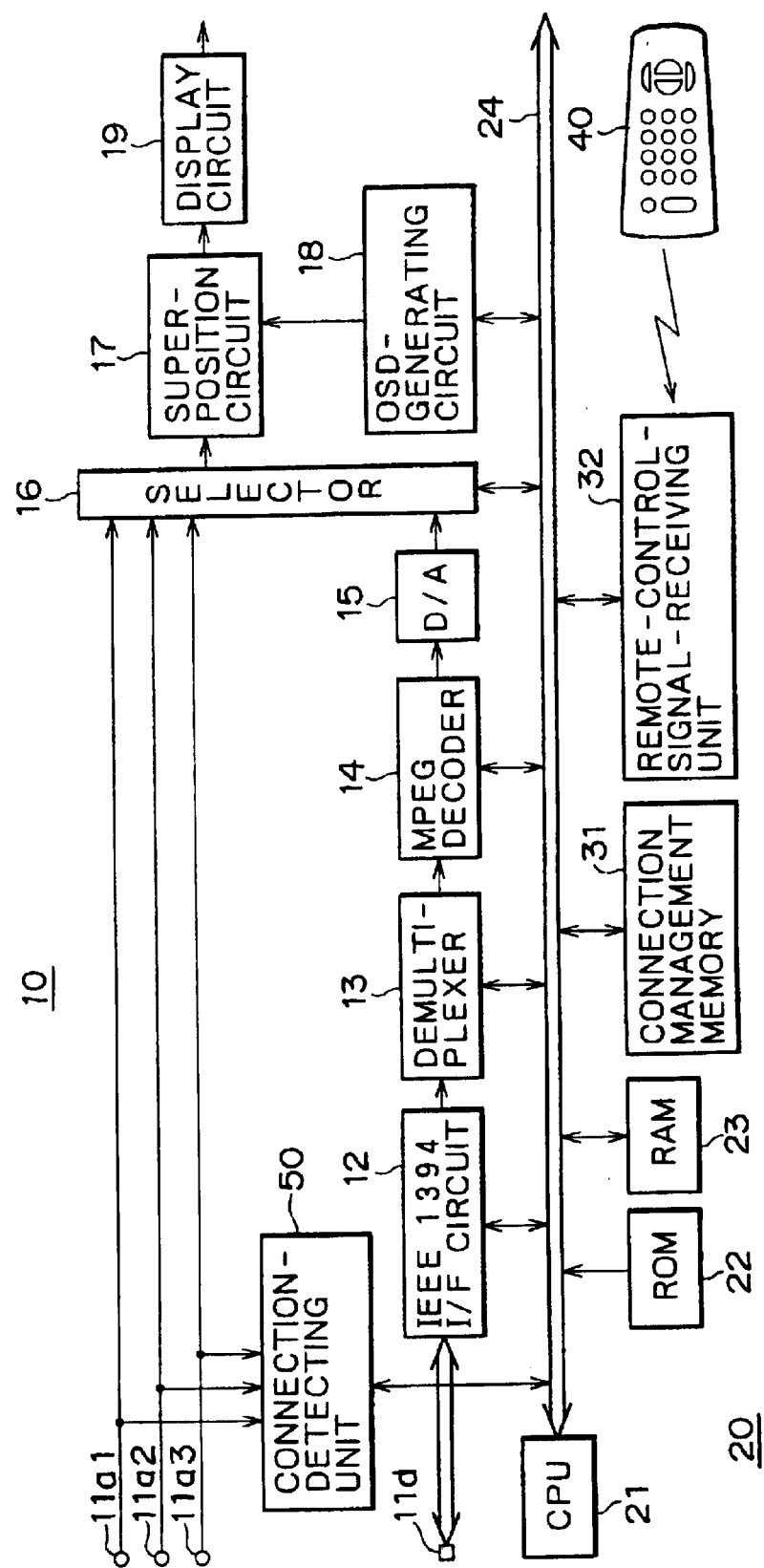
FIG. 10 is an explanatory block diagram showing a monitor apparatus used as an information-outputting apparatus implemented by another embodiment of the present invention.

By monitoring the levels of signals coming from the analog input terminals 11a1, 11a2 and 11a3, the impedances or the like at a stage after the analog input terminals 11a1, 11a2 and 11a3 as shown in FIG. 10, a connection-detecting unit 50 provided at the stage is capable of detecting disconnection of an electronic apparatus connected to the analog input terminal 11a1, 11a2 or 11a3 and addition of a new electronic apparatus connected to the analog input terminal 11a1, 11a2 or 11a3. The connection-detecting unit 50 then reports such disconnection or addition to the control unit 20.

The monitor apparatus 10 shown in FIG. 10 is the same as that shown in FIG. 3 except that the former has the newly added connection-detecting unit 50. When the connection-detecting unit 50 then informs the control unit 20 of disconnection of an electronic apparatus connected to the analog input terminal 11a1, 11a2 or 11a3 of the monitor apparatus 10 and addition of a new electronic apparatus connected to the analog input terminal 11a1, 11a2 or 11a3, the control unit 20 starts the series of operations to create an analog-connection management table as described above.

In addition, by detecting a change in digital connection as well as a change in analog connection and reporting such a change to the control unit 20 as described above, it is possible to reconstruct an analog-connection management table in the event of either a change in digital connection or a change in analog connection.

By reconstructing an analog-connection management table in the event of either a change in digital connection or a change in analog connection as described above, the monitor apparatus 10 is capable of managing associations of analog input terminals thereof with electronic apparatuses each connected to one of the analog input terminals based on an always accurate analog-connection management table.

Moreover, the monitor apparatus 10 is capable of keeping an always accurate analog-connection management table in its own connection management memory 31 by setting the 3 aforementioned timings to create an analog-connection management table as follows:

(1) when the analog-connection management table is found non-existent in the connection management memory 31 at the time the power supply of the monitor 10 is turned on;

(2) when the monitor apparatus 10 receives a request for creation of an analog-connection management table from the user; and (3) when a change in digital or analog connection is detected.

When there is a change in analog or digital connection, by entering necessary information via typically the remote commander 40, for example, the user is also capable of making a modification representing the change to an already created analog-connection management table of FIG. 7 appearing on the screen of the display unit employed in the monitor apparatus 10. In this case, the information entered by the user makes data included in the analog-connection management table correct all the time. In addition, by executing a function to be described later, the monitor apparatus 10 is capable of managing, for example, an electronic apparatus connected to the monitor apparatus 10 through only an analog signal cable by including information on the electronic apparatus in the analog-connection management table.

[Other Examples of How to Acquire Information Peculiar to Digitally Connected Electronic Apparatuses]

In the embodiments described above, the monitor apparatus 10 obtains information peculiar to an electronic apparatus connected to the monitor apparatus 10 by using a digital bus conforming to the IEEE 1394 standard by issuing an inquiry about SDD (Self Describing Devices) information defined in the digital interface conforming to the IEEE 1394 standard, and then extracting the peculiar information from the SDD information. It should be noted, however, that the way to acquire peculiar information is not limited to what is described above.

For example, each electronic apparatus may include peculiar information conforming to the digital interface of the IEEE 1394 standard in a descriptor and transmit the descriptor to the monitor apparatus 10.

In this alternative embodiment, the monitor apparatus 10 refers to the descriptor received as an input supplied by an electronic apparatus through the digital I/O terminal 11d and acquires the peculiar information from the descriptor. Thus, in this case, information such as a product category and the name of a manufacturer in the analog-connection management table shown in FIG. 7 is peculiar information acquired from a descriptor.

In addition, the monitor apparatus 10 serving as an information recipient also detects information such as a node ID also defined in the digital interface conforming to the IEEE 1394 standard. Then, the control unit 20 employed in the monitor apparatus 10 presumes a network topology (or a connection configuration) comprising electronic apparatuses connected to each other by a digital bus conforming to the IEEE 1394 standard in order to create a topology map on the basis of information such as node IDs received from the electronic apparatuses, which are connected to the monitor apparatus 10 by the digital bus conforming to the IEEE 1394 standard.

The topology map is information indicating how electronic apparatuses including the monitor apparatus 10 are connected to each other by using a digital bus conforming to the IEEE 1394 standard. Then, the topology map and associations of the electronic apparatuses with their respective node IDs are stored typically in the RAM 23.

Figure 11:
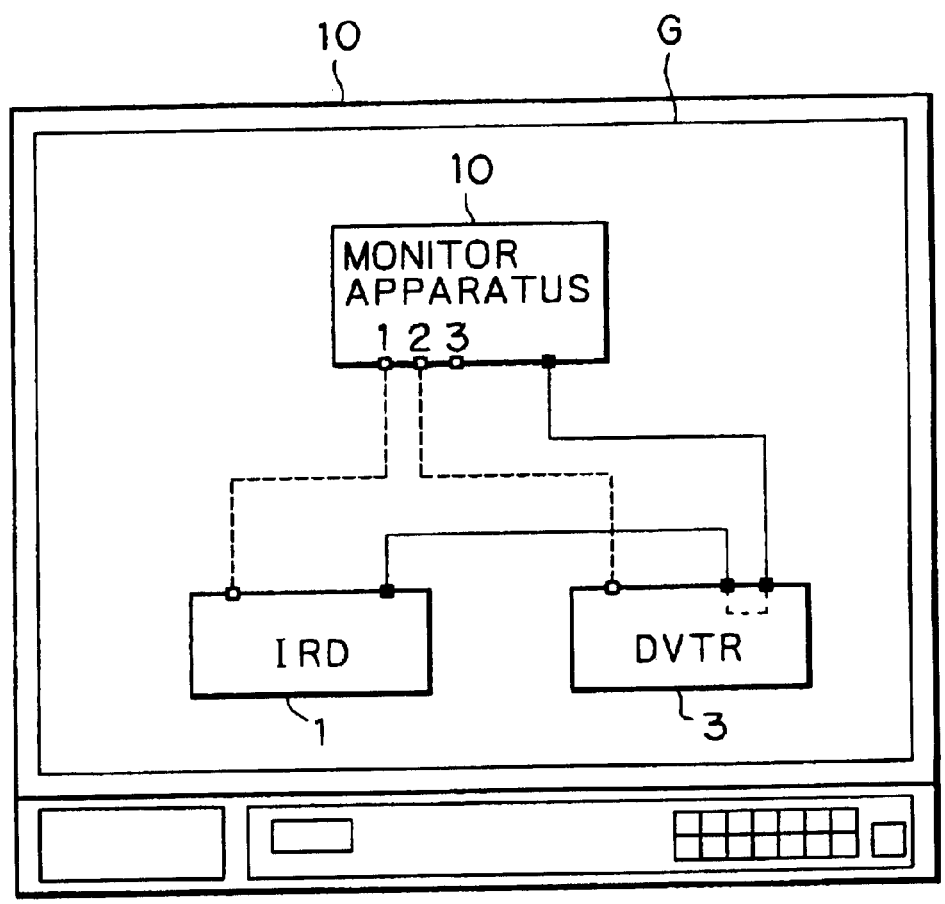
FIG. 11 is an explanatory diagram showing connections drawn on a display screen of the monitor apparatus based on a topology map.

The control unit 20 displays a connection diagram like one shown in FIG. 11 on the screen G of the display unit employed in the monitor apparatus 10 on the basis of the topology map and the associations of the node IDs stored in the RAM 23. Also in this case, the control unit 20 supplies information necessary for generating OSD data for displaying the connection diagram to the OSD-generating circuit 18 in order to display the connection diagram like the one shown in FIG. 11 on the screen G of the display unit employed in the monitor apparatus 10.

The user of the monitor apparatus 10 is thus capable of setting analog connection relations selectively by looking at the connection diagram appearing on the screen G of the display unit employed in the monitor apparatus 10. In FIG. 11, solid lines connecting the electronic apparatuses to each other are the digital bus conforming to the IEEE 1394 standard. The state of connections based on the digital bus is shown automatically by creation based on information such as the topology map and the node IDs.

To put it in detail, the user operates the remote commander 40 of the monitor apparatus 10 to select one of 3 analog input terminals 1, 2 and 3 of the monitor apparatus 10. The selected analog input terminal 1, 2 or 3 is a terminal most likely connected to the analog output terminal of the IRD 1. That is to say, the user selects the analog input terminal 1, 2 or 3 that has most likely been or will most likely be connected to the analog output terminal of the IRD 1.

By the same token, the user operates the remote commander 40 of the monitor apparatus 10 to select one of 3 analog input terminals 1, 2 and 3 of the monitor apparatus 10. Selected analog input terminal 1, 2 or 3 is a terminal most likely connected to the analog output terminal of the DVTR 3. That is to say, the user selects analog input terminal 1, 2 or 3 that has most likely been or will most likely be connected to the analog output terminal of the DVTR 3.

As a result of the above operations carried out by the user to select analog input terminal 1, 2 or 3 of the monitor apparatus 10 for the analog output terminal of the IRD 1 and select analog input terminal 1, 2 or 3 of the monitor apparatus 10 for the analog output terminal of the DVTR 3, analog connections are displayed on the screen as indicated by dashed lines in FIG. 11 to allow the user to visually confirm the connections.

In FIG. 11, analog input terminals 1, 2 and 3 of the monitor apparatus 10 correspond to the analog input terminals 11a1, 11a2 and 11a3 described earlier.

As described above, a topology map is created on the basis of information such as node IDs of electronic apparatuses transmitted by a function of a digital interface conforming to the IEEE 1394 standard and the user is capable of setting and confirming a configuration of analog connections with a high degree of accuracy by looking at a displayed state of connections between the monitor apparatus 10 and other electronic apparatuses.

The state of analog connections between the monitor apparatus 10 and other electronic apparatuses, which is obtained as a result of the automatic creation and the selective setting as shown in FIG. 11, is stored in the connection management memory 31 employed in the monitor apparatus 10. Thus, information showing the state of connections is stored in the connection management memory 31 as a topology map, which also functions as the analog-connection management table described earlier.

That is to say, the monitor apparatus 10 uses the information showing the state of connections for determining which analog input terminal of the monitor apparatus 10 is connected to an electronic apparatus, which currently serves as a source outputting a digital signal, in the monitor apparatus 10. When necessary, the user is also allowed to enter a command to display the connection diagram shown in FIG. 11 on the screen G of the display unit employed in the monitor apparatus 10. The connection diagram shows not only digital connections but also analog connections to the user correctly and accurately.

In addition, when an electronic apparatus alternately supplying both analog and digital signals to the monitor apparatus 10 switches the output signal from digital to analog or vice versa, the monitor apparatus 10 uses the information of the topology map stored in the connection management memory 31 of the monitor apparatus 10 as a basis for automatically switching the input terminal receiving the input signal from the digital I/O terminal 11d1 to one of the analog input terminals 11a1, 11a2 and 11a3 or vice versa in dependence on information peculiar to the electronic apparatus received as part of the digital signal.

The aforementioned peculiar information for identifying an electronic apparatus connected to the monitor apparatus 10 by the digital bus can be SDD information, peculiar information included in a descriptor or information such as a node ID as described earlier.

Not only does an electronic apparatus transmit detectable peculiar information to the monitor apparatus 10 through the digital interface conforming to the IEEE 1394 standard, but it is needless to say that the monitor apparatus 10 may also be designed as an apparatus capable of issuing an inquiry about peculiar information or a request for transmission of peculiar information to any of the electronic apparatuses through the digital bus, a transmission path other than the digital bus or a radio communication.

That is to say, an electronic apparatus serving as a recipient of information receives information peculiar to electronic apparatuses each serving as a source generating a digital signal from the source apparatuses and reports the peculiar information to the user in order to inform the user of a source apparatus most likely connected to each analog input terminal of the recipient apparatus so that a state of analog connections of the source apparatuses can be set, managed and utilized in the recipient apparatus. In this embodiment, the electronic apparatus serving as a recipient of information is the monitor apparatus 10 whereas the electronic apparatuses each serving as a source generating a digital signal are the IRD 1 and the DVTR 3.

In addition, it is possible to manage not only digital connections, but also analog connections. Thus, in a state where both transmission of digital signals and transmission of analog signals exist, it is possible to well prepare a more convenient environment for utilizing both the digital and analog signals.

In the above description, the embodiments are used for exemplifying a case in which the IRD 1 and the DVTR 3 are each connected to the monitor apparatus 10 by using both an analog signal cable and the digital bus. It should be noted, however, that an electronic apparatus does not have to be connected to the monitor apparatus 10 by using both an analog signal cable and the digital bus.

That is to say, it is needless to say that the present invention can also be applied to a case wherein an electronic apparatus is connected to the monitor apparatus 10 by using only an analog signal cable while another electronic apparatus is connected to the monitor apparatus 10 by using only the digital bus. In this case, the analog-connection management table or the connection diagram may still include an electronic apparatus connected to the monitor apparatus 10 by using only an analog signal cable and an electronic apparatus connected to the monitor apparatus 10 by using only the digital bus.

The inclusion of an electronic apparatus connected to the monitor apparatus 10 by using only an analog signal cable and an electronic apparatus connected to the monitor apparatus 10 by using only the digital bus allows the user and the monitor apparatus 10 to form a judgment as to whether an electronic apparatus is connected to the monitor apparatus 10 by using only an analog signal cable, only the digital bus or both.

In addition, in the embodiments described above, the analog-connection management table created in the connection management memory 31 employed in the monitor apparatus 10 can be made accessible from any electronic apparatus connected to the monitor apparatus 10 by using the digital bus. For example, an electronic apparatus connected to the monitor apparatus 10 by using the digital bus issues an inquiry about the analog-connection management table to the monitor apparatus 10, and the monitor apparatus 10 presents the analog-connection management table to the electronic apparatus issuing the inquiry.

In this way, the electronic apparatus issuing the inquiry is capable of verifying that the apparatus itself is indeed cataloged as an apparatus connected to the monitor apparatus 10 by using an analog signal cable. If the electronic apparatus itself is indeed cataloged as an apparatus connected to the monitor apparatus 10 by using an analog signal cable, an operation in the monitor apparatus 10 to switch the input from the digital I/O terminal to an analog input terminal connected to the electronic apparatus can surely be carried out automatically in accordance with a command entered by the user or at a request made by the electronic apparatus itself.

In addition, in the embodiments described above, information peculiar to electronic apparatuses digitally connected to the monitor apparatus 10 is displayed on the screen of the display unit of the monitor apparatus 10. It should be noted, however, that the method of reporting the information is not limited to such a display. For example, the peculiar information can also be reported to the user as a voice or sound. In this case, the user is then capable of selecting and setting an analog connection relation upon hearing the voice or sound. As another alternative, the peculiar information can also be reported to the user as a printout on a piece of paper produced by typically a printer unit connected to the monitor apparatus 10.

Moreover, in the embodiments described above, the analog input terminals are the so-called VLR terminals comprising a video input terminal V, a left-channel audio input terminal L and a right-channel audio input terminal R. It is worth noting, however, that the analog input terminals do not have to be the VLR terminals. For example, the analog input terminals can be RGB, composite, YUV or YC terminals.

In the case of connections among electronic apparatuses each having analog input terminals of different types, it is possible to create management information indicating which electronic apparatus is connected to each analog input terminal in work to connect the analog input terminals. That is to say, the management information indicates associations of analog output terminals of electronic apparatuses each serving as a source of an analog signal with analog input terminals of electronic apparatuses each serving as a recipient of an analog signal on a 1-with-1 basis. The present invention can be applied to a case in which some relations based on the 1-with-1 basis exist among the electronic apparatuses.

Furthermore, the embodiments described above are used for exemplifying a case in which a digital interface conforming to the IEEE 1394 standard is adopted. It should be noted, however, that the digital interface does not have to conform to the IEEE 1394 standard. It is possible to adopt a variety of digital interfaces as long as the interfaces are capable of transmitting and receiving information peculiar to an electronic apparatus serving as a source of an information signal such as video and audio signals besides the information signal itself.

In addition, the embodiments described above are used for exemplifying a case in which the monitor apparatus 10 receives either an analog signal or a digital signal at a time from an electronic apparatus such as a DVTR connected to the monitor apparatus 10. It is worth noting that the scope of the present invention is not limited to these embodiments.

For example, the present invention can also be applied to a case in which an electronic apparatus connected to the monitor apparatus 10 supplies both an analog signal and a digital signal at the same time to the monitor apparatus 10. When the monitor apparatus 10 is receiving both an analog signal and a digital signal at the same time, for example, the user is allowed to enter a command requesting the monitor apparatus 10 to accept the digital signal only. In this case, the monitor apparatus 10 discontinues the reception of the analog signal. On the contrary, the user is allowed to enter a command requesting the monitor apparatus 10 to accept the analog signal only. In this case, the monitor apparatus 10 discontinues the reception of the digital signal. As an alternative, acceptance priority levels are assigned to the analog and digital signals. In this case, either an analog signal or a digital signal is selected in accordance with the assigned priority levels.

Typically, the control unit 20 forms a judgment as to whether to accept an analog signal supplied to the monitor apparatus 10 through an analog interface or a digital signal supplied to the monitor apparatus 10 through a digital interface. The outcome of the judgment is used for switching the input to the analog or digital signal. The formation of the judgment can also be based on the state or contents of the digital and analog signals supplied to the monitor apparatus 10.

Moreover, the embodiments described above are used for exemplifying a case in which a monitor apparatus serves as an information-outputting apparatus for receiving analog and digital signals supplied by a variety of electronic apparatuses and outputting the signals. It should be noted, however, that the scope of the present invention is not limited to these embodiments. For example, the present invention can also be applied to a variety of apparatuses such as an IRD and a DVTR, which typically have a display unit such as an LCD (Liquid Crystal Display) device and are capable of receiving digital and analog signals from a variety of electronic apparatuses, processing the signals and outputting a result of processing.

Furthermore, the embodiments described above are used for exemplifying construction of a system from the so-called AV (Audio Visual) apparatus such as a monitor apparatus, an IRD and a DVTR. It is worth noting, however, that the scope of the present invention is not limited to these embodiments. For example, the present invention can also be applied to an information-outputting apparatus employed in a system including a computer provided with analog and digital terminals.

Moreover, the embodiments described above are used for exemplifying a case in which a digital interface conforming to the IEEE 1394 standard coexists with an analog interface. It should be noted, however, that the scope of the present invention is not limited to these embodiments. For example, the present invention can also be applied to a case in which a digital interface capable of recognizing a partner apparatus connected by digital communication means such as the digital interface conforming to the IEEE 1394 standard coexists with a digital interface incapable of recognizing a partner apparatus connected by digital communication means.

The digital interface incapable of recognizing a partner apparatus connected by digital communication means corresponds to the analog interface adopted in the embodiments described above. The present invention can thus be applied to a case for managing associations of digital input terminals for the digital interface incapable of recognizing a partner apparatus connected by digital communication means with electronic apparatuses each connected to one of the digital input terminals.

In addition, the embodiments described above are used for exemplifying a case in which the digital information signal output by the DVTR 3 is digital data read out from a video tape and the analog information signal output by the DVTR 3 is a signal representing an analog television broadcast. It is worth noting, however, that the scope of the present invention is not limited to these embodiments. The present invention can be applied to not only a case in which the digital and analog information signals are different from each other. For example, the present invention can also be applied to a case in which the digital and analog information signals actually represent the same content.

What is claimed is:

1. An information-outputting system comprising:
    a digital I/O terminal connecting said information-outputting system to a plurality of electronic apparatuses through a digital bus and allowing identification information each peculiar to one of said electronic apparatuses to be detected by a communication;
    electronic-apparatus-information-detecting means for detecting said identification information each peculiar to one of said electronic apparatuses connected to said digital I/O terminal;
    information-reporting means for reporting said identification information each peculiar to one of said electronic apparatuses detected by said electronic-apparatus-information-detecting means to a user;
    a plurality of analog input terminals for connecting said information-outputting system to said electronic apparatuses;
    apparatus-selecting and setting means for selecting and setting one of said electronic apparatuses connected to one of said analog input terminals for each of said identification information peculiar to said electronic apparatuses as reported by said information-reporting means;
    information management means for managing an association of each of said identification information peculiar to said electronic apparatuses with one of said analog input terminals connected to said electronic apparatus selected by said apparatus-selecting and setting means for said identification information;
    input-switching means for switching an input terminal for receiving a signal among said digital I/O terminal and said analog input terminals to select one of said digital I/O terminal and said analog input terminals;
    digital-signal-existence/non-existence-detecting means for detecting existence or non-existence of a digital signal destined for said information-outputting system by said digital I/O terminal; and
    switching control means for controlling said input-switching means in accordance with a detection signal output by said digital-signal-existence/non-existence-detecting means and information managed by said information management means,
    wherein the association of the identification information peculiar to the electronic apparatuses with one of the plurality of analog input terminals is established by the user to generate an analog-connection management table based on user input,
    wherein the plurality of electronic apparatuses includes at least one dual-output electronic apparatus that outputs to both the digital bus and to at least one analog input terminal, and
    wherein the switching control means causes the input-switching means to select a corresponding analog input terminal associated with the dual-output apparatus by the user when the digital-signal-existence/non-existence-detecting means no longer detects the existence of a digital signal from the dual-output apparatus.

2. The information-outputting system according to claim 1, further comprising:
    management-start-determining means for forming a judgment as to whether or not management by said information management means has been started; and
    control means for executing control so as to detect said identification information each peculiar to one of said electronic apparatuses and to start managing associations of said identification peculiar information with said respective analog input terminals in case an outcome of said judgment formed by said management-start-determining means indicates that said management by said information management means has not been started.

3. The information-outputting system according to claim 1, further comprising:
    command-receiving means for receiving a command entered by the user to start management of information; and
    control means for executing control so as to detect said identification information each peculiar to one of said electronic apparatuses and to start managing associations of said identification peculiar information with said respective analog input terminals in response to a command entered by the user to start said management of information through said command-receiving means.

4. The information-outputting system according to claim 1, further comprising:
    connection-change-detecting means for detecting a change in connection relation; and
    control means for executing control so as to detect said identification information each peculiar to one of said electronic apparatuses and to start managing associations of said identification peculiar information with said respective analog input terminals in the event of a change in connection relation detected by said connection-change-detecting means.

5. The information-outputting system according to claim 1, further comprising:
    change-information-receiving means for receiving information used for changing said associations of said analog input terminals with their respective identification information each peculiar to one of said electronic apparatuses; and association-changing means for changing said associations, managed by said information management means, of said analog input terminals with their respective identification information each peculiar to one of said electronic apparatuses in accordance with said information received through said change-information-receiving means.

6. The information-outputting system according to claim 1, wherein each of said identification information peculiar to one of said electronic apparatuses comprises the name of a manufacturer making said one of said electronic apparatuses, the product category of said one of said electronic apparatuses and the type of said one of said electronic apparatuses.

7. The information-outputting system according to claim 1, wherein said information-reporting means reports information to the user by displaying said information on a screen of a display unit.

8. The information-outputting system according to claim 7, wherein:

said information-reporting means also displays a table of said identification information each peculiar to one of said electronic apparatuses; and said table is used as a select menu for selecting one of said identification information each peculiar to one of said electronic apparatuses and setting an association of said selected identification information with one of said analog input terminals.

9. The information-outputting system according to claim 1, wherein said information-reporting means reports information to the user as a voice or a sound.

10. The information-outputting system according to claim 1, wherein said information-reporting means reports information to the user as a printout on a piece of paper produced by a printer.

11. The information-outputting system according to claim 1, wherein said apparatus-selecting and setting means is used for selecting one of said electronic apparatuses actually connected to a predetermined one of said analog input terminals of said information-outputting system and setting an association of said selected electronic apparatus with said predetermined analog input terminal connected to said selected one of said electronic apparatuses.

12. A connection-relation management method in an information-outputting apparatus including a digital I/O terminal connecting said information-outputting apparatus to a plurality of electronic apparatuses through a digital bus and allowing identification information each peculiar to one of said electronic apparatuses to be detected by a communication, said information-outputting apparatus further including a plurality of analog input terminals for connecting said information-outputting apparatus to said electronic apparatuses, said connection-relation management method used for managing connection relations between said information-outputting apparatus and said electronic apparatuses, said method comprising:

detecting said identification information each peculiar to one of said electronic apparatuses connected to said digital I/O terminal;

managing an association of each of said identification information peculiar to said electronic apparatuses with one of said analog input terminals connected to said electronic apparatus;

detecting existence or non-existence of a digital signal destined for said information-outputting apparatus by said digital I/O terminal; and switching an input terminal for receiving a signal among said digital I/O terminal and said analog input terminals to select one of said digital I/O terminal and said analog input terminals in accordance with a result of detection of existence or non-existence of a digital signal destined for said information-outputting apparatus and an association of each of said identification information peculiar to said electronic apparatuses with one of said analog input terminals connected to said one of said electronic apparatuses, wherein the association of the identification information peculiar to the electronic apparatuses with one of the plurality of analog input terminals is established by the user to generate an analog-connection management table based on user input, wherein the plurality of electronic apparatuses includes at least one dual-output electronic apparatus that outputs to both the digital bus and to at least one analog input terminal, and wherein said switching selects a corresponding analog input terminal associated with the dual-output apparatus by the user when the existence of a digital signal from the dual-output apparatus is no longer detected.

13. The connection-relation management method according to claim 12, said method further comprising:

reporting said identification information each peculiar to one of said electronic apparatuses to the user;

letting the user select one of said electronic apparatuses as an apparatus connected to one of said analog input terminals for each of said identification information; and managing by associating said identification information peculiar to said selected one of said electronic apparatuses with said analog input terminal connected to said selected one of said electronic apparatuses.

14. The connection-relation management method according to claim 13, wherein said identification information each peculiar to one of said electronic apparatuses are reported to the user by being displayed on a screen of a display unit.

15. The connection-relation management method according to claim 14, wherein:

the analog-connector table of said identification information each peculiar to one of said electronic apparatuses is also displayed on said screen; and said table is used as a select menu for selecting one of said identification information each peculiar to one of said electronic apparatuses and setting an association of said selected identification information with one of said analog input terminals.

16. The connection-relation management method according to claim 13, wherein said identification information each peculiar to one of said electronic apparatuses are reported to the user as a voice or a sound.

17. The connection-relation management method according to claim 13, wherein said identification information each peculiar to one of said electronic apparatuses are reported to the user as a printout on a piece of paper produced by a printer.

18. The connection-relation management method according to claim 13, wherein one of said electronic apparatuses actually connected to a predetermined one of said analog input terminals of said information-outputting apparatus is selected and said selected one of said electronic apparatuses is associated with said predetermined analog input terminal connected to said selected one of said electronic apparatuses.

19. The connection-relation management method according to claim 12, said method further comprising:
    forming a judgment as to whether or not management of said identification information each peculiar to one of said electronic apparatuses has been started; and
    executing management so as to detect said identification information each peculiar to one of said electronic apparatuses and to start managing associations of said identification information with said respective analog input terminals in case an outcome of said judgment of said pieces of information each peculiar to one of said electronic apparatuses indicates that said management has not been started.

20. The connection-relation management method according to claim 12, said method further comprising:
    receiving a command entered by the user to start management of information; and
    executing management so as to detect said identification information each peculiar to one of said electronic apparatuses and to start managing associations of said identification information with said respective analog input terminals in response to a command entered by the user to start said management of information.

21. The connection-relation management method according to claim 12, said method further comprising:
    detecting a change in connection relation; and
    detecting identification information each peculiar to one of said electronic apparatuses and starting management of associations of said identification information with said respective analog input terminals in the event of a detected change in connection relation.

22. The connection-relation management method according to claim 12, said method further comprising:
    receiving information used for changing said associations of said analog input terminals with their respective identification information each peculiar to one of said electronic apparatuses from the user; and
    changing said associations of said analog input terminals with their respective identification information each peculiar to one of said electronic apparatuses in accordance with said information received from the user.

23. The connection-relation management method according to claim 12, wherein each of said identification information peculiar to one of said electronic apparatuses comprises the name of a manufacturer making said electronic apparatus, the product category of said electronic apparatus and the type of said electronic apparatus.

24. An information-outputting system comprising:
    a digital I/O terminal connecting said information-outputting system to a plurality of electronic apparatuses through a digital bus and allowing identification information each peculiar to one of said electronic apparatuses to be detected by a communication;
    a connection-detecting unit configured to detect said identification information each peculiar to one of said electronic apparatuses connected to said digital I/O terminal and to report said identification information each peculiar to one of said electronic apparatuses detected by said connection-detecting unit to a user;
    a plurality of analog input terminals configured to connect said information-outputting system to said electronic apparatuses;
    a control unit configured to select and set one of said electronic apparatuses connected to one of said analog input terminals for each of said identification information peculiar to said electronic apparatuses as reported by said connection-detecting unit and to manage an association of each of said identification information peculiar to said electronic apparatuses with one of said analog input terminals connected to said electronic apparatus selected by said control unit for said identification information;
    a selector configured to switch an input terminal for receiving a signal among said digital I/O terminal and said analog input terminals to select one of said digital I/O terminal and said analog input terminals;
    a digital-signal-existence/non-existence-detecting unit configured to detect existence or non-existence of a digital signal destined for said information-outputting system by said digital I/O terminal; and
    a switching control unit configured to control said selector in accordance with a detection signal output by said digital-signal-existence/non-existence-detecting unit and information managed by said control unit,
    wherein the association of the identification information peculiar to the electronic apparatuses with one of the plurality of analog input terminals is established by the user to generate an analog-connection management table based on user input,
    wherein the plurality of electronic apparatuses includes at least one dual-output electronic apparatus that outputs to both the digital bus and to at least one analog input terminal, and
    wherein the switching control unit causes the selector to select a corresponding analog input terminal associated with the dual-output apparatus by the user when the digital-signal-existence/non-existence-detecting unit no longer detects the existence of a digital signal from the dual-output apparatus.

25. The information-outputting system according to claim 24, further comprising:
    a management-start-determining unit configured to form a judgment as to whether or not management by said control unit has been started; and
    an execution unit configured to execute control so as to detect said identification information each peculiar to one of said electronic apparatuses and to start managing associations of said identification information with said respective analog input terminals in case an outcome of said judgment formed by said management-start-determining unit indicates that said management by said control unit has not been started.

26. The information-outputting system according to claim 24, further comprising:
    a command-receiving unit configured to receive a command entered by the user to start management of information; and
    an execution unit configured to execute control so as to detect said identification information each peculiar to one of said electronic apparatuses and to start managing associations of said identification information with said respective analog input terminals in response to a command entered by the user to start said management of information through said command-receiving unit.

27. The information-outputting system according to claim 24, further comprising:
    a connection-change-detecting unit configured to detect a change in connection relation; and
    an execution unit configured to execute control so as to detect said identification information each peculiar to one of said electronic apparatuses and to start managing associations of said identification information with said respective analog input terminals in the event of a change in connection relation detected by said connection-change-detecting unit.

28. The information-outputting system according to claim 24, further comprising:

a change-information-receiving unit configured to receive information used for changing said associations of said analog input terminals with their respective identification information each peculiar to one of said electronic apparatuses; and an association-changing unit configured to change said associations, managed by said control unit, of said analog input terminals with their respective identification information each peculiar to one of said electronic apparatuses in accordance with said information received through said change-information-receiving unit.

29. The information-outputting system according to claim 24, wherein each of said identification information peculiar to one of said electronic apparatuses comprises the name of a manufacturer making said electronic apparatus, the product category of said electronic apparatus and the type of said electronic apparatus.

30. The information-outputting system according to claim 24, wherein said control unit reports information to the user by displaying said information on a screen of a display unit.

31. The information-outputting system according to claim 30, wherein:

said control unit also displays a table of said identification information each peculiar to one of said electronic apparatuses, and said table is used as a select menu for selecting one of said identification information each peculiar to one of said electronic apparatuses and setting an association of said selected identification information with one of said analog input terminals.

32. The information-outputting system according to claim 24, wherein said control unit reports information to the user as a voice or a sound.

33. The information-outputting system according to claim 24, wherein said control unit reports information to the user as a printout on a piece of paper produced by a printer.

34. The information-outputting system according to claim 24, wherein said control unit selects one of said electronic apparatuses actually connected to a predetermined one of said analog input terminals of said information-outputting system and sets an association of said selected electronic apparatus with said predetermined analog input terminal connected to said selected electronic apparatus.

* * * * *